US012705784B2

(12) United States Patent
Johansson et al.

(10) Patent No.: US 12,705,784 B2
(45) Date of Patent: Aug. 11, 2026

(54) EXTRINSIC PARAMETER PREDICTION FOR IMAGE SENSOR(S)

(71) Applicant: QUALCOMM Incorporated, San Diego, CA (US)

(72) Inventors: Bjoern Johansson, Linköping (SE); Hagen Spies, Stockholm (SE)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/927,740

(22) Filed: Oct. 25, 2024

(65) Prior Publication Data

US 2026/0120309 A1 Apr. 30, 2026

(51) Int. Cl.
*G06T 7/70* (2017.01)

(52) U.S. Cl.
CPC ...... *G06T 7/70* (2017.01); *G06T 2207/20081* (2013.01); *G06T 2207/20084* (2013.01); *G06T 2207/30244* (2013.01)

(58) Field of Classification Search
CPC ............. G06T 7/70; G06T 2207/20081; G06T 2207/20084; G06T 2207/30244
See application file for complete search history.

(56) References Cited

U.S. PATENT DOCUMENTS 7,129,973 B2 * 10/2006 Raynor ............. H04N 1/32128 348/231.3
8,700,641 B2 * 4/2014 Covell .................. G06F 16/683 707/758
8,996,810 B2 * 3/2015 Liang .................. G06F 16/2365 711/119
11,215,700 B2 * 1/2022 Schockaert ............. G01S 17/36
11,706,544 B2 * 7/2023 Sawada ................... G06F 21/73 348/308
11,727,724 B1 * 8/2023 Soares .................. G06F 18/214 345/419
11,783,542 B1 * 10/2023 Goldman .................. G06T 7/20 345/423
12,307,699 B2 * 5/2025 Wang ...................... G06T 19/00
2007/0124756 A1 * 5/2007 Covell .................. G06F 16/635 348/E7.071
2014/0313390 A1 * 10/2014 Uemura ................ G03B 13/00 348/335
2015/0116822 A1 * 4/2015 Mori ...................... G02B 21/06 359/385

(Continued)

OTHER PUBLICATIONS

Zhou S., et al., "Higher Accuracy Self-supervised Visual Odometry with Reliable Projection", ResearchGate, Artificial Life and Robotics 27, Jun. 10, 2022, 9 Pages.

*Primary Examiner* — Michael B. Pierorazio
(74) *Attorney, Agent, or Firm* — Dinsmore & Shohl LLP/QUALCOMM Incorporated

(57) ABSTRACT

The present disclosure provide techniques for extrinsic parameter prediction, such as for one or more cameras. A method may include obtaining a first frame for a first time period, wherein the first frame is associated with a first image sensor; processing, with a first sub-model of a machine learning (ML) model, at least the first frame; and obtaining a relative pose of the first image sensor with respect to an object or a second image sensor, wherein the relative pose of the first image sensor is provided as output from the first sub-model and is based on the processing.

20 Claims, 15 Drawing Sheets

(56) References Cited

U.S. PATENT DOCUMENTS

2016/0156972 A1* 6/2016 Oztaskent .......... G06Q 30/0246
725/14
2016/0327782 A1* 11/2016 Mori ........................ A61B 1/07
2016/0377856 A1* 12/2016 Mori ........................ H04N 9/77
348/70
2017/0094349 A1* 3/2017 Maughan ......... H04N 21/44226
2017/0168286 A1* 6/2017 Mori .................. G02B 23/2469
2017/0261135 A1* 9/2017 Mori .................... G02B 23/243
2017/0276925 A1* 9/2017 Mori .................... G02B 21/367
2018/0197306 A1* 7/2018 Fukunishi ............ H04N 13/211
2019/0034753 A1* 1/2019 Mori ...................... G16B 45/00
2019/0080466 A1* 3/2019 Mori ......................... G06T 7/70
2019/0239738 A1* 8/2019 Mori ........................ A61B 1/00
2019/0373195 A1* 12/2019 Minagawa ............. H04N 25/78
2019/0383946 A1* 12/2019 Namba .................. G06V 20/58
2020/0242806 A1* 7/2020 Mori .................... H04N 13/246
2020/0268234 A1* 8/2020 Nakagawa ............. G02B 23/26
2021/0056695 A1* 2/2021 Mori ......................... G06T 7/90
2021/0097656 A1* 4/2021 Kondo ................... G06N 3/084
2021/0166369 A1* 6/2021 Baek ........................ G06N 3/08
2021/0166446 A1* 6/2021 Chen ........................ G06N 3/08
2021/0192684 A1* 6/2021 Pardeshi ................. G06T 17/10
2021/0211312 A1* 7/2021 Lu ............................ G11C 7/24
2022/0230356 A1* 7/2022 Shang ..................... G06T 17/00
2022/0252857 A1* 8/2022 Mori ......................... G06T 5/60
2022/0351806 A1* 11/2022 Rey ........................ G06N 20/10
2024/0265508 A1* 8/2024 Onishi ...................... G06T 5/60
2025/0095380 A1* 3/2025 Kanai ................. B60W 40/105
2025/0200781 A1* 6/2025 Lore ......................... G06T 7/75
2025/0292425 A1* 9/2025 Sah .......................... G06T 7/75

* cited by examiner

Figure 12:
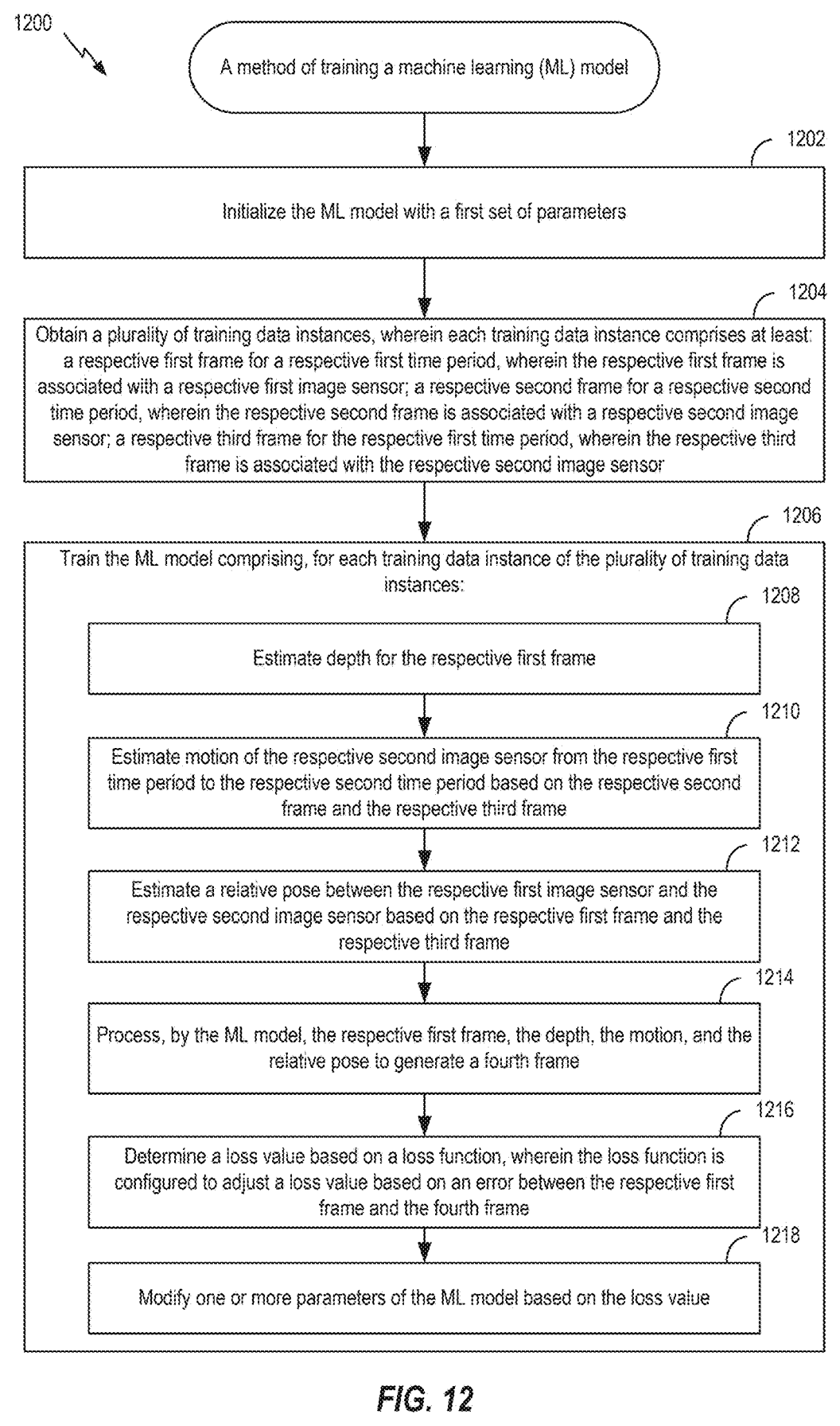

1200

A method of training a machine learning (ML) model

1202 Initialize the ML model with a first set of parameters

1204 Obtain a plurality of training data instances, wherein each training data instance comprises at least: a respective first frame for a respective first time period, wherein the respective first frame is associated with a respective first image sensor; a respective second frame for a respective second time period, wherein the respective second frame is associated with a respective second image sensor; a respective third frame for the respective first time period, wherein the respective third frame is associated with the respective second image sensor 1206 Train the ML model comprising, for each training data instance of the plurality of training data instances:

1208 Estimate depth for the respective first frame

1210 Estimate motion of the respective second image sensor from the respective first time period to the respective second time period based on the respective second frame and the respective third frame 1212 Estimate a relative pose between the respective first image sensor and the respective second image sensor based on the respective first frame and the respective third frame 1214 Process, by the ML model, the respective first frame, the depth, the motion, and the relative pose to generate a fourth frame 1216 Determine a loss value based on a loss function, wherein the loss function is configured to adjust a loss value based on an error between the respective first frame and the fourth frame 1218 Modify one or more parameters of the ML model based on the loss value

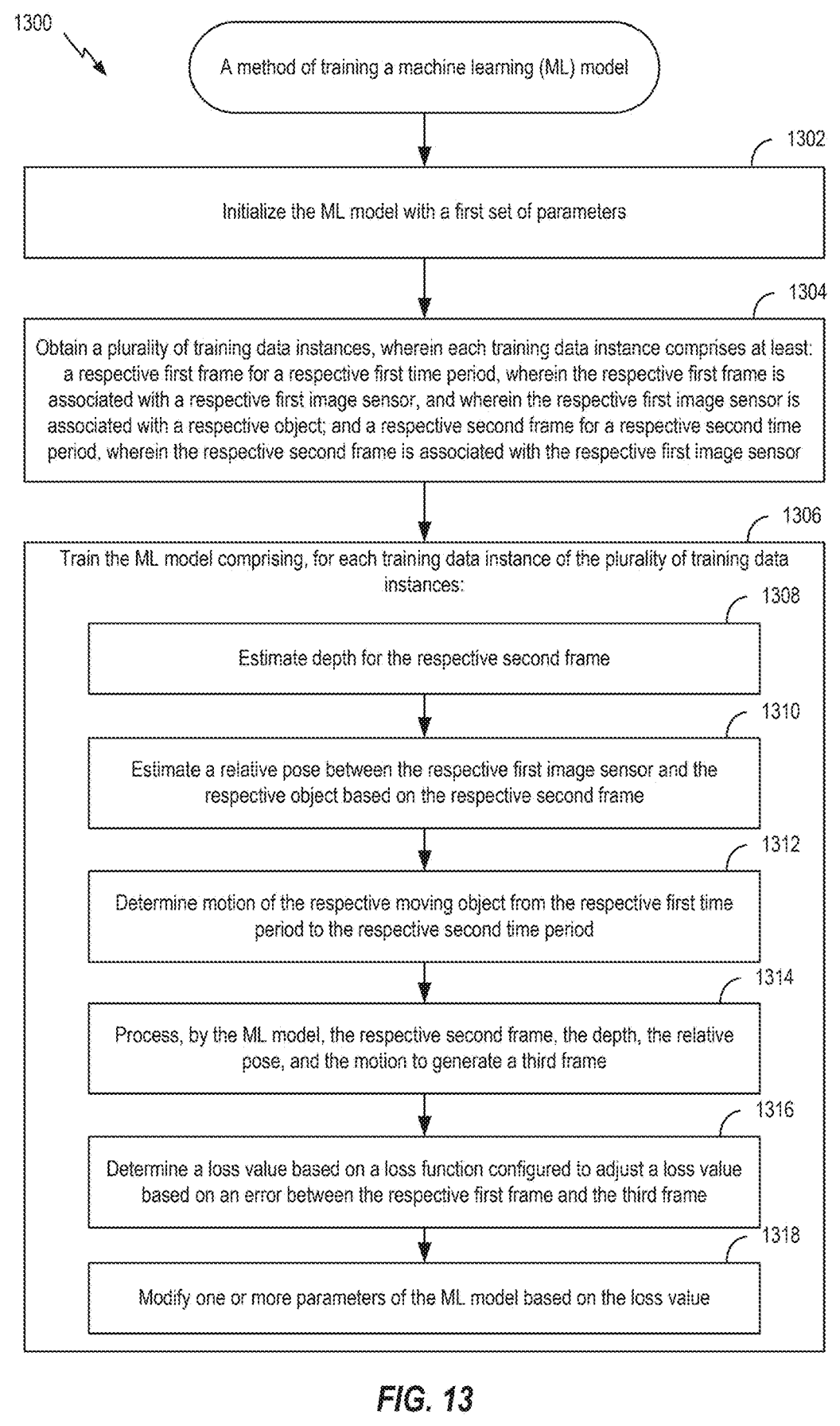

A method of training a machine learning (ML) model

1302

Initialize the ML model with a first set of parameters

1304

Obtain a plurality of training data instances, wherein each training data instance comprises at least: a respective first frame for a respective first time period, wherein the respective first frame is associated with a respective first image sensor, and wherein the respective first image sensor is associated with a respective object; and a respective second frame for a respective second time period, wherein the respective second frame is associated with the respective first image sensor

1306

Train the ML model comprising, for each training data instance of the plurality of training data instances:

1308

Estimate depth for the respective second frame

1310

Estimate a relative pose between the respective first image sensor and the respective object based on the respective second frame

1312

Determine motion of the respective moving object from the respective first time period to the respective second time period

1314

Process, by the ML model, the respective second frame, the depth, the relative pose, and the motion to generate a third frame

1316

Determine a loss value based on a loss function configured to adjust a loss value based on an error between the respective first frame and the third frame

1318

Modify one or more parameters of the ML model based on the loss value

FIG. 13

EXTRINSIC PARAMETER PREDICTION FOR IMAGE SENSOR(S)

FIELD OF THE DISCLOSURE

Aspects of the present disclosure relate to techniques for extrinsic parameter prediction, such as for one or more image sensors (e.g., cameras).

DESCRIPTION OF RELATED ART

The field of computer vision has observed significant advancements in recent years with the development of sophisticated perception systems that enable autonomous intelligent systems, such as autonomous vehicles (simply referred to herein as "vehicles"), to perceive their surroundings. For example, a perception system of an autonomous vehicle may be used to sense and interpret an environment surrounding the vehicle through one or more sensors, such as to enable the vehicle to understand and/or safely navigate its environment.

An example sensor installed at, or on, an autonomous vehicle may include an image sensor (e.g., a camera), a light detection and ranging (LiDAR) equipment, a sound navigation and ranging (SONAR) sensor, a radio detection and ranging (RADAR) sensor, etc. An image sensor, for example, is an electronic device that may capture visual information from the vehicle's surroundings as two-dimensional (2D) images (simply referred to herein as an "image"). In certain aspects, an autonomous vehicle may include only a single image sensor, whereas in certain other aspects, an autonomous vehicle may include multiple image sensors, such as in multiple (multi) image sensor systems (also commonly referred to as "multi-camera systems"). A multi-image sensor system is a setup that uses multiple image sensors to capture images from different angles and perspectives with respect to reference coordinate system. For example, in a multi-image sensor system, multiple image sensors may be mounted at, or on, a vehicle, such that each image sensor is facing a different direction associated with the vehicle.

FIG. 1 depicts an example configuration 100 of a multi-camera rig system, which may be a multi-camera system deployed at, or on, a rig, such as a vehicle 102. The vehicle 102 may include six cameras (not shown in FIG. 1), each associated with a different field-of-view (FOV) 104-1 through 104-6 (individually referred to herein as an "FOV 104" and collectively referred to herein as "FOVs 104"). One camera of the six cameras may be mounted at, or on, a front of the vehicle 102, such that the camera is a front-viewing camera (e.g., a forward facing camera). The front-viewing camera may be associated with FOV 104-1. Another camera of the six cameras may be mounted at, or on, at back of the vehicle 102, such that the camera is a rear-viewing camera (e.g., a backwards facing camera). The rear-viewing camera may be associated with FOV 104-2. Two other cameras of the six cameras may be mounted at, or on, a left side of the vehicle 102, such that the two cameras are left side-viewing cameras (e.g., left facing cameras). One left-side viewing camera may be associated with FOV 104-3, and the other left-side viewing camera may be associated with FOV 104-4. The remaining two cameras of the total six cameras may be right side-viewing cameras (e.g., right facing cameras). One right-side viewing camera may be associated with FOV 104-6, and the other right-side viewing camera may be associated with FOV 104-5. The FOVs 104-1, 104-2 associated with the front-viewing and rear-viewing cameras may be larger than the FOVs 104-3, 104-4, 104-5, and 104-6 associated with the left-viewing and right-viewing cameras, based on the resolutions of the front-viewing and rear-viewing cameras being greater than the resolutions of the left-viewing and right-viewing cameras. In certain other examples, different cameras may have the same or different resolutions. In certain aspects, the individual cameras (of the multi-camera system) are arranged in a way such that that they have minimum (or zero) overlapping FOVs 104, such as in order to provide the vehicle 102 with a wider combined FOV coverage for better surrounding perception.

The six cameras of the vehicle 102 may observe the same three-dimensional (3D) space surrounding the vehicle 102 and generate 2D images of the 3D space from different positions and/or at different angles. Put different, the 2D images may capture the 3D space at different positions and/or angles based on the six cameras of the vehicle 102 having different camera poses. A pose may refer to a particular position and orientation of an object (e.g., such as an image sensor or camera) relative to another object (e.g., such as the vehicle 102, another moving object, another image sensor, or another camera).

Data fusion techniques may be used to fuse and correlate image data (e.g., the image(s)) from one or more of the six cameras for better understanding of the vehicle 102's surroundings. For example, data fusion techniques may be used to obtain a more accurate and reliable understanding of the vehicle 102's surroundings compared to an understanding of the vehicle 102's surrounding obtained from a single one of the cameras. For example, the fused data may enable greater perception accuracy, given the fused data may leverage the strengths of one or more cameras to overcome the limitations of one or more other cameras.

Cameras of a multi-camera system, such as the multi-camera system depicted in FIG. 1, may need to be calibrated prior to performing data fusion of their image data. Multi-camera calibration may include estimating intrinsic parameters and extrinsic parameters between different pairs of cameras. Intrinsic parameters of a camera may describe a geometric property of the camera, such as a focal length, a principal point (e.g., a point, with x and y coordinates, on an image plane where the camera's optical axis intersects the image plane), and lens distortion parameters, to name a few. Extrinsic parameters of a camera may define the position (T) and orientation (R) of the camera, such as with respect to the world or another object. Thus, extrinsic parameters of a camera may define the camera's relative pose, which may describe the position and orientation of the camera in 3D space by specifying how much the camera has moved (translation, T) and how the camera has been rotated around a point (rotation, R) relative to a reference frame. When fusing together image data from at least two cameras of the multi-camera system, intrinsic and extrinsic parameters determined for the at least two cameras may be used to compute metric 3D reconstruction of the imaged scene surrounding the vehicle. In some cases, this information may then be used to autonomously navigate the vehicle through its environment.

SUMMARY

One aspect provides a method for relative pose estimation. The method may include obtaining a first frame for a first time period, wherein the first frame is associated with a first image sensor; processing, with a first sub-model of a machine learning (ML) model, at least the first frame; and obtaining a relative pose of the first image sensor with respect to an object or a second image sensor, wherein the relative pose of the first image sensor is provided as output from the first sub-model and is based on the processing.

One aspect provides a method for training a machine learning (ML) model. The method may include initializing the ML model with a first set of parameters; obtaining a plurality of training data instances, wherein each training data instance comprises at least: a respective first frame for a respective first time period associated with a respective first image sensor; a respective second frame for a respective second time period associated with a respective second image sensor; and a respective third frame for the respective first time period associated with the respective second image sensor; training the ML model comprising, for each training data instance of the plurality of training data instances: estimating depth for the respective first frame; estimating motion of the respective second image sensor from the respective first time period to the respective second time period based on the respective second frame and the respective third frame; estimating a relative pose between the respective first image sensor and the respective second image sensor based on the respective first frame and the respective third frame; processing, by the ML model, the respective first frame, the depth, the motion, and the relative pose to generate a respective fourth frame; determining a loss value based on a loss function, wherein the loss function is configured to adjust a loss value based on an error between the respective first frame and the respective fourth frame; and modifying one or more parameters of the ML model based on the loss value.

One aspect provides a method for training a machine learning (ML) model. The method may include initializing the ML model with a first set of parameters; obtaining a plurality of training data instances, wherein each training data instance comprises at least: a respective first frame for a respective first time period associated with a respective first image sensor, wherein the respective first image sensor is associated with a respective object; and a respective second frame for a respective second time period associated with the respective first image sensor; training the ML model comprising, for each training data instance of the plurality of training data instances: estimating depth for the respective second frame; estimating a relative pose between the respective first image sensor and the respective object based on the respective second frame; determining motion of the respective object from the respective first time period to the respective second time period; processing, by the ML model, the respective second frame, the depth, the relative pose, and the motion to generate a respective third frame; determining a loss value based on a loss function, wherein the loss function is configured to adjust a loss value based on an error between the respective first frame and the respective third frame; and modifying one or more parameters of the ML model based on the loss value.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIG. 12 depicts an example method for training an ML model to, at least, predict image sensor extrinsic parameters.

FIG. 13 depicts another example method for training an ML model to, at least, predict image sensor extrinsic parameters.

DETAILED DESCRIPTION

Figure 1:
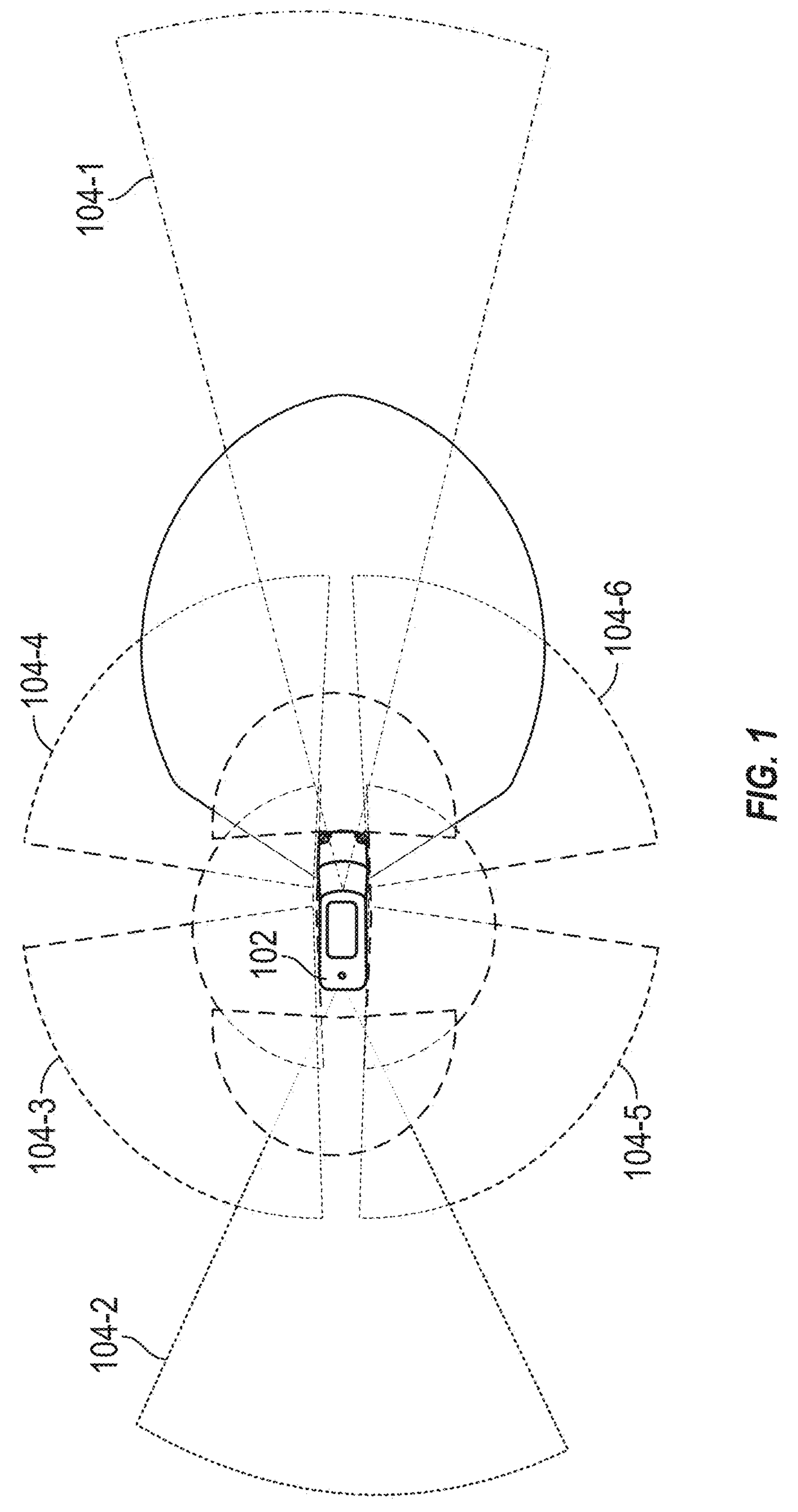
FIG. 1 depicts an example configuration of a multiple-camera rig system.

Aspects of the present disclosure provide apparatuses, methods, processing systems, and computer-readable mediums for extrinsic parameter prediction, such as for one or more image sensors (e.g., cameras). In certain aspects, extrinsic parameter prediction for an image sensor may include estimating a relative pose of the image sensor with respect to another image sensor, such as where the two image sensors are mounted at, or on, an object (e.g., an autonomous vehicle). In certain aspects, extrinsic parameter prediction for an image sensor may include estimating a relative pose of the image sensor with respect to an object (e.g., a moving object) associated with the image sensor (e.g., the image sensor may be mounted at, or on, the object). Extrinsic parameters may be predicted for an image sensor that is part of a larger multiple image sensor system associated with an autonomous vehicle. Although aspects herein describe the use of extrinsic parameter prediction techniques to estimate the relative pose of image sensor(s) deployed at, or on, an autonomous vehicle, it is noted that the extrinsic parameter prediction techniques described herein may be similarly used to estimate the relative pose of image sensor(s) for other scenarios, such as deployed for other autonomous intelligent systems, such as including robots, to name one example.

Visual odometry (VO) is one example method that has been conventionally used to estimate relative pose between image sensors. For example, VO is a technique that may estimate the pose of an image sensor by analyzing corresponding images generated by the image sensor. VO techniques work by first detecting some low-level features of a scene, such as corners and/or lines, captured in multiple frames (e.g., generated by the image sensor), and then estimating pose according to the geometric information of corresponding features in the different frames.

Due to the low cost and capability of image sensors to generate rich, visual information for a scene, visual-based pose estimation methods, such as VO, may be desired for relative pose estimation. However, VO is not without limitation. That is, VO techniques may assume that a scene captured in the multiple frames has constant illumination and consists of static objects; however, this may not always be the case. For example, complex environments (e.g., such as outdoor environments) may have variable illumination (e.g., during the night, when it rains, at high speeds due to motion blur, etc.), dynamic objects (e.g., vehicles, pedestrians, cyclists, etc.), and/or occlusion (e.g., partial or full occlusion of one or more objects captured in the multiple frames). As such, VO accuracy may decline when used in such environments, and thus may not be reliable for image sensor relative pose estimation in these environments.

Additionally, extrinsic parameters, such as mounting angles and positions, of an image sensor may change over time. For example, an image sensor mounted at, or on, a vehicle may change over time due to external factors, such as mechanical vibrations, temperature, movement of a part of the vehicle where the image sensor is mounted, such as movement from folding mirrors, human interference, etc. Further, in some cases, initial relative pose estimated for an image sensor may be suboptimal due to one or more factors. For example, the nominal mounting angles in a computer-aided design (CAD) of a forward-mounted image sensor, may have values of roll, pitch, and yaw equal to zero; however, the real mounting of the image sensor may be off by a few degrees from zero. As another example, some vehicle manufactures may perform an initial static calibration, such as in a factory, to determine the mounting angle and/or position of an image sensor instead of relying on a nominal CAD value; however, this initial static calibration may become suboptimal over time, especially in cases where a vehicle, that the image sensor is mounted on, changes load, the temperature changes, etc. As such, relative pose initially estimated for an image sensor may need to be re-estimated over time (e.g., such as re-estimated regularly over time) to adapt to such changes. Re-estimation of an image sensor's relative pose may be referred to herein as "dynamic extrinsic calibration."

Using conventional methods, such as VO, for dynamic extrinsic calibration may result in the consumption of a large number of resources. For example, re-tracing local image features through images in time may result in a large computational overhead, although central processing unit (CPU) resources may be limited. Thus, in some cases, dedicated accelerated hardware resources may be utilized instead, which may not be desired. Further, the accuracy and/or robustness of conventional methods, such as VO, when used for dynamic extrinsic calibration may, in some cases, be suboptimal. Accordingly, there is a need for methods to re-estimate the calibration parameters, such as extrinsic parameters, of image sensors as they change over time.

Certain aspects described herein overcome the aforementioned technical problems associated with some extrinsic parameter estimation techniques, such as for dynamic extrinsic calibration, and provide a technical benefit to the field of computer vision. Specifically, certain aspects described herein introduce ML models that leverage deep learning for at least image sensor extrinsic parameter prediction. In certain aspects, the ML models may be trained to perform the task of extrinsic parameter prediction, e.g., relative pose estimation, together with other sub-tasks.

For example, in certain aspects, self-supervised learning may be used to train the ML model to perform frame prediction. That is, during training, the ML model may be provided with, as input, a current frame (e.g., associated with a first time period) and a previous frame (e.g., associated with a second time period) generated by a first image sensor, as well as a current frame (e.g., associated with the first time period) generated by a second image sensor. The first image sensor and the second image sensor may be synchronized in time. The ML model may include three sub-models used to process the current frame of the first image sensor, the previous frame of the first image sensor, and the current frame of the second image sensor, such as to predict the current frame for the second image sensor. For example, a first sub-model of the ML model (e.g., an example relative pose prediction model, such as a multilayer convolutional neural network (CNN), a vision transformer, or another ML architecture, which is referred to herein as "ExtrinsicNet") may be used to predict a relative pose of the second image sensor with respect to the first image sensor, based on the current frame associated with the first image sensor and the current frame associated with the second image sensor. A second sub-model of the ML model (e.g., an example change in pose prediction model, such as a multilayer CNN, a vision transformer, or another ML architecture, which is referred to herein as "PoseNet") may be used to predict a change in pose of the first image sensor from the previous frame to the current frame generated by the first image sensor. Further, a third sub-model of the ML model (e.g., an example depth prediction model, such as a multilayer CNN, a vision transformer, or another ML architecture, which is referred to herein as "DepthNet") may be used to predict depth for the current frame generated by the second image sensor. The outputs from each of these sub-models, including (1) the predicted pose of the second image sensor relative to the first image sensor, (2) the predicted change in pose of the first image sensor, and (3) the predicted depth for the current frame generated by the second image sensor, may be used by the ML model to predict the current frame generated by the second image sensor. A loss value may be determined based on a photometric error between the predicted current frame and the actual current frame generated by the second image sensor, and subsequently used to modify one or more parameters of the ML model, including parameters of the first, second, and third sub-models.

Following training, the first sub-model may be extracted from the larger ML model and used independently to predict relative pose between image sensors based on at least a first frame from a first image sensor and a second frame from a second image sensor. As such, the first sub-model may be used to predict relative poses between multiple image sensors.

In certain other aspects, self-supervised learning may be used to train the ML model to perform frame prediction based on frames from only a single image sensor. That is, during training, the ML model may be provided with, as input, a current frame (e.g., associated with a first time period) and a previous frame (e.g., associated with a second time period) generated by a first image sensor. The ML model may include two sub-models used to process the current frame and the previous frame of the first image sensor, such as to predict the current frame for the first image sensor. For example, a first sub-model of the ML model (e.g., an example relative rotation prediction model that estimates relative rotation with fixed position, such as a multilayer CNN, a vision transformer, or another ML architecture, which is referred to herein as "RotNet Extrinsics") may be used to predict a relative pose of the first image sensor with respect to an object, such as a moving object, associated with the first image sensor (e.g., a moving vehicle that the first image sensor is mounted on) based on the current frame. A second sub-model of the ML model (e.g., an example depth prediction model, such as a multilayer CNN, a vision transformer, or another ML architecture, which is referred to herein as "DepthNet") may be used to predict depth for the current frame. The outputs from each of these sub-models, including (1) the predicted pose of the first image sensor relative to the object and (2) the predicted depth for the current frame generated by the first image sensor, in addition to information about the motion of the object, may be used by the ML model to predict the previous frame generated by the first image sensor. A loss value may be determined based on a photometric error between the predicted previous frame and the actual previous frame generated by the first image sensor, and subsequently used to modify one or more parameters of the ML model, including parameters of the first and second sub-models.

Following training, the first sub-model may be extracted from the larger ML model and used independently to predict image sensor pose relative to an object (e.g., such as a moving object) based on at least one frame from an image sensor. As such, the first sub-model may be used to predict extrinsic parameters for a single image sensor based on image data generated by the image sensor.

In certain aspects, the ML models described thus provide significant technical advantages over conventional solutions, such as improved image sensor extrinsic parameter estimation accuracy and/or the ability to re-perform extrinsic parameters estimation with significantly less computational overhead. These technical effects may overcome technical problems of low extrinsic parameter estimation accuracy and increased resource consumption in conventional approaches, such as VO, for image sensor extrinsic parameter prediction. For example, the ML models described herein may not rely on local image features to estimate image sensor extrinsic parameters, like conventional approaches, and thus provide a technical advantage over those conventional approaches. Further, the ML models described herein may be better suited, than conventional approaches, to run on available hardware (e.g., available hardware may include more ML resources), as well as provide an ability to estimate image sensor extrinsic parameters for image sensors deployed in complex environments (e.g., where the image sensors may capture poor visual information for a scene).

Example Extension of an ML Framework

As described above, certain aspects described herein provide methods for training an ML model to perform frame prediction, such that at least a sub-model of the ML model is also simultaneously trained to predict extrinsic parameters for one or more image sensors. In certain aspects, such training may be based on an ML framework used for the estimation of depth and motion, where motion refers to the change in pose of an image sensor over time. For example, the training described herein may extend the ML framework to not only train the ML model to predict motion and depth, but also train the ML model to predict extrinsic parameters for one or more image sensors.

Figure 2:
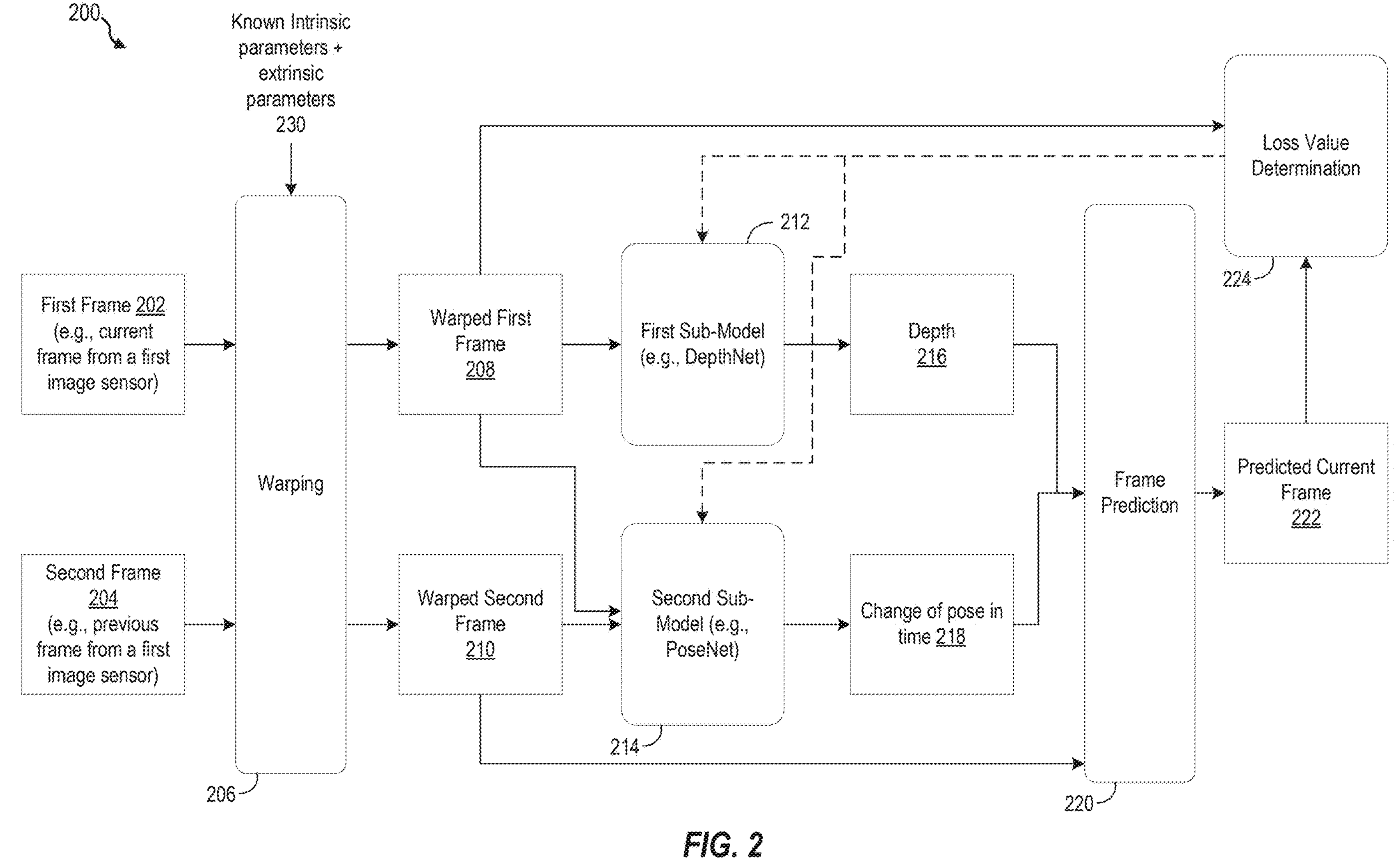
FIG. 2 depicts a machine learning (ML) framework used for training an ML model to estimate of depth and motion.

FIG. 2 depicts the ML framework 200 used for training an ML model to estimate depth and motion. As shown in FIG. 2, training the ML model may include training the ML model to (1) perform depth estimation using a first sub-model 212, (2) perform motion estimation using a second sub-model 214, and (3) perform frame prediction based on the estimated depth 216 and the estimated motion, or the estimated change of pose in time 218 of an image sensor.

As an illustrative example, training the ML model may begin by initializing the ML model with one or more parameters (e.g., weights, connections, a number of hidden nodes, weight decay, etc.). For example, each of the first sub-model 212 and the second sub-model 214 may be initialized with a first respective set of parameters.

Multiple training data instances may be used to train the ML model. Each training data instance may include a first frame and a second frame. The first frame and the second frame may comprise frames generated by a same image sensor at different time periods. For example, the first frame of a training data instance may include a 2D image of a 3D space that is captured by an image sensor at time T=x, and the second frame of the training data instance may include a 2D of the same 3D space captured by the same image sensor, but at time T=0. Time T=x may occur later in time than time T=0. Thus, the first frame may represent a current frame at the current time T=x, while the second frame may represent a previous frame at a previous time T=0.

Training the ML model using an example training data instance, including first frame 202 and second frame 204, is depicted in FIG. 2. First frame 202 and second frame 204 may be frames generated by a first image sensor. For illustration, the first frame 202 may be a 2D image capturing a scene in front of a car that is generated by the first image sensor, which is a front-viewing image sensor on an autonomous vehicle. Further, for illustration, the second frame 204 may be a 2D image capturing the scene in front of the car, which is generated by the first image sensor earlier in time than the first frame 202. In particular, the first frame 202 may be generated by the first image sensor for a first time period and the second frame 204 may generated by the second image sensor for a second time period (e.g., the first time period is later in time than the second time period). As used herein, a "time period" may refer to a specific span or duration of time, which may be defined by a starting time point and an ending time point. For example, the second time period may refer to a duration from time T=0 seconds to time T=4 seconds, and the first time period may refer to a duration from time T=5 seconds to time T=8 seconds. The second frame 204 generated for the second time period may be a frame generated during any time point(s) between (and including) time T=0-4 seconds. The first frame 202 generated for the first time period may be a frame generated during any time point(s) between (and including) time T=5-8 seconds.

To train the ML model, the first frame 202 and the second frame 204 may first be warped. Image warping at 206 may refer to transforming a frame into a warped frame, for example, transforming an image into another image. In certain aspects, image warping 206 may include performing image distortion, which may involve removing lens distortion from an input frame. In certain aspects, image warping at 206 may include performing image rectification, which may involve removing image sensor pitch, such that the warped frame has zero pitch. For example, a warped frame with zero pitch may include image data depicting vertical structures in a real-world scene that are vertical in the image data. In certain aspects, image warping at 206 may include performing equirectangular projection, such as for input frames generated by fisheye surround cameras.

In certain aspects, image warping at 206 may be based on intrinsic parameters and estimated extrinsic parameters (e.g., relative pose) 230 of the first image sensor used to generate first frame 202 and second frame 204. As described herein, intrinsic parameters of the first image sensor may include a focal length, a principal point, and/or lens distortion parameters associated with the first image sensor. Extrinsics parameters of the first image sensor may include an estimated position (T) and orientation (R) of the first image sensor, such as with respect to the world or another object. In certain aspects, the extrinsic parameters of the first image sensor may be estimated using conventional VO techniques, described in detail above.

In this example, image warping at 206 may be used to warp the first frame 202 to generate the warped first frame 208. Further, image warping at 206 may be used to warp the second frame 204 to generate the warped second frame 210.

Training the ML model may then proceed with estimating depth information (simply referred to herein as "depth 216") for the warped first frame 208. For example, first sub-model 212, e.g., DepthNet, of the ML model may be used to process the warped first frame 208 and generate depth 216 as output. Depth 216 may indicate the distance of each pixel in warped first frame 208 from the first image sensor (e.g., such as at the first time period when first frame 202 was generated by the first image sensor).

Training the ML model may also proceed with estimating a change of pose in time 218. The change of pose in time 218 may indicate the change of the first image sensor pose over time. For example, second sub-model 214, e.g., PoseNet, of the ML model may be used to process the warped first frame 208 and the warped second frame 210 to generate the change of pose in time 218. In this example, change of pose in time 218 may indicate the predicted change in pose of the first image sensor from the second time period (e.g., when second frame 204 was generated by the first image sensor) to the first time period (e.g., when first frame 202 was generated by the first image sensor). This change of pose in time 218 may indicate the motion of the first image sensor from the second time period to the first time period.

Training the ML model may then proceed with performing frame prediction 220. Frame prediction 220 may include processing depth 216, the change of pose in time 218, and warped second frame 210 to generate a predicted current frame 222. The predicted current frame 222 may represent the first frame 202, as predicted by the ML model. For example, the ML model may use this input (e.g., depth 216, change of pose in time 218, and warped second frame 210) to geometrically predict the first frame 202, except for (1) object(s) in the scene that may be occluded in warped second frame 210 (or second frame 204), (2) object(s) in the scene that may be occluded in warped first frame 208 (or first frame 202), and/or (3) moving object(s) for which an (estimated) motion is incorrect.

Loss value determination 224 may then be performed to determine whether to modify one or more parameters of the ML model. For example, loss value determination 224 may include evaluating the similarity of the predicted current frame 222 to the warped first frame 208, and determining a loss value based on the evaluation. In certain aspects, loss value determination 224 is performed using a loss function. The loss function may be configured to adjust the loss value determined at loss value determination 224 based on some error between the predicted current frame 222 and the warped first frame 208. For example, greater error between the predicted current frame 222 and the warped first frame 208 may result in a greater loss value determined than where the error is less.

In certain aspects, the loss function may be configured to adjust the loss value determined at loss value determination 224 based on simple photometric error, or more specifically, a difference between the predicted current frame 222 and the warped first frame 208. For example, a difference in intensity (e.g., for greyscale images) or color values may be determined for one or more pixels (e.g., in some cases for each pixel) of the predicted current frame 222 and the warped first frame 208. The simple photometric error between the predicted current frame 222 and the warped first frame 208 may be the mean or median of all pixel differences.

In certain aspects, the loss function may be configured to adjust the loss value determined at loss value determination 224 based on a determined difference in local textures between the predicted current frame 222 and the warped first frame 208. In certain aspects, the loss value may be determined based on using an increased weight in certain regions of the predicted current frame 222 and the warped first frame 208, than other regions. For example, the loss value may be determined by emphasizing (e.g., applying a large weight) local edges of the predicted current frame 222 and the warped first frame 208, and ignoring (e.g., applying a smaller weight) regions with dynamic objects in the predicted current frame 222 and the warped first frame 208.

In certain aspects, the loss function may be configured to adjust the loss value determined at loss value determination 224 based on a structural similarity index measure (SSIM). The SSIM may be a perceptual metric that quantifies image quality degradation between the predicted current frame 222 and the warped first frame 208.

Determining whether to modify one or more parameters of the ML model, such as modifying parameters of the first sub-model 212 and the second sub-model 214 (shown via dotted lines in FIG. 2), may be based on the loss value determined for loss value determination 224.

In certain aspects, multiple training data instances are used to train the ML model. For example, multiple training data instances may be provided as input into the ML model to (1) generate depths 216, (2) generate changes of pose in time 218, (3) generate predicted current frames 222, (4) determine loss values, and, in some cases, (5) modify parameter(s) of the ML model. Training the ML model may be complete when all available training input (e.g., training data instances) have been used to train the ML model and/or when a training termination condition is reached for the model. One example of a training termination condition may include convergence (e.g., further training may not lead to any significant loss reduction). Another example of training termination condition may include a number of training steps/epoches reaching pre-determined limit(s) and/or divergence (e.g., further training may cause over-fitting as diagnosable by increasing evaluation loss). Other examples of training termination conditions include early stopping criteria, reaching a maximum number of updates, etc.

Following training, the first sub-model 212 may be extracted from the larger ML model and used independently to perform depth information prediction for an input frame. Additionally, or alternatively, the second sub-model 214 may be extracted from the larger ML model and used independently to perform motion estimation (e.g., estimation of changes in pose in time) for two input frames captured by a same image sensor at different time periods.

This ML framework shown in FIG. 2 for training the ML model may assume that extrinsic parameters of an image sensor are known. Aspects herein may use a similar ML framework as that shown in FIG. 2 to train an ML model; however, extrinsic parameters for image sensor(s) may not be assumed, but instead may be predicted by adding an additional sub-model of the ML model. This additional sub-model may be trained to predict image sensor extrinsic parameters based on training the ML model for frame prediction. This training is depicted and described with respect to FIGS. 3, 4, and 6.

Example Image Sensor Extrinsic Parameter Prediction

Figure 3:
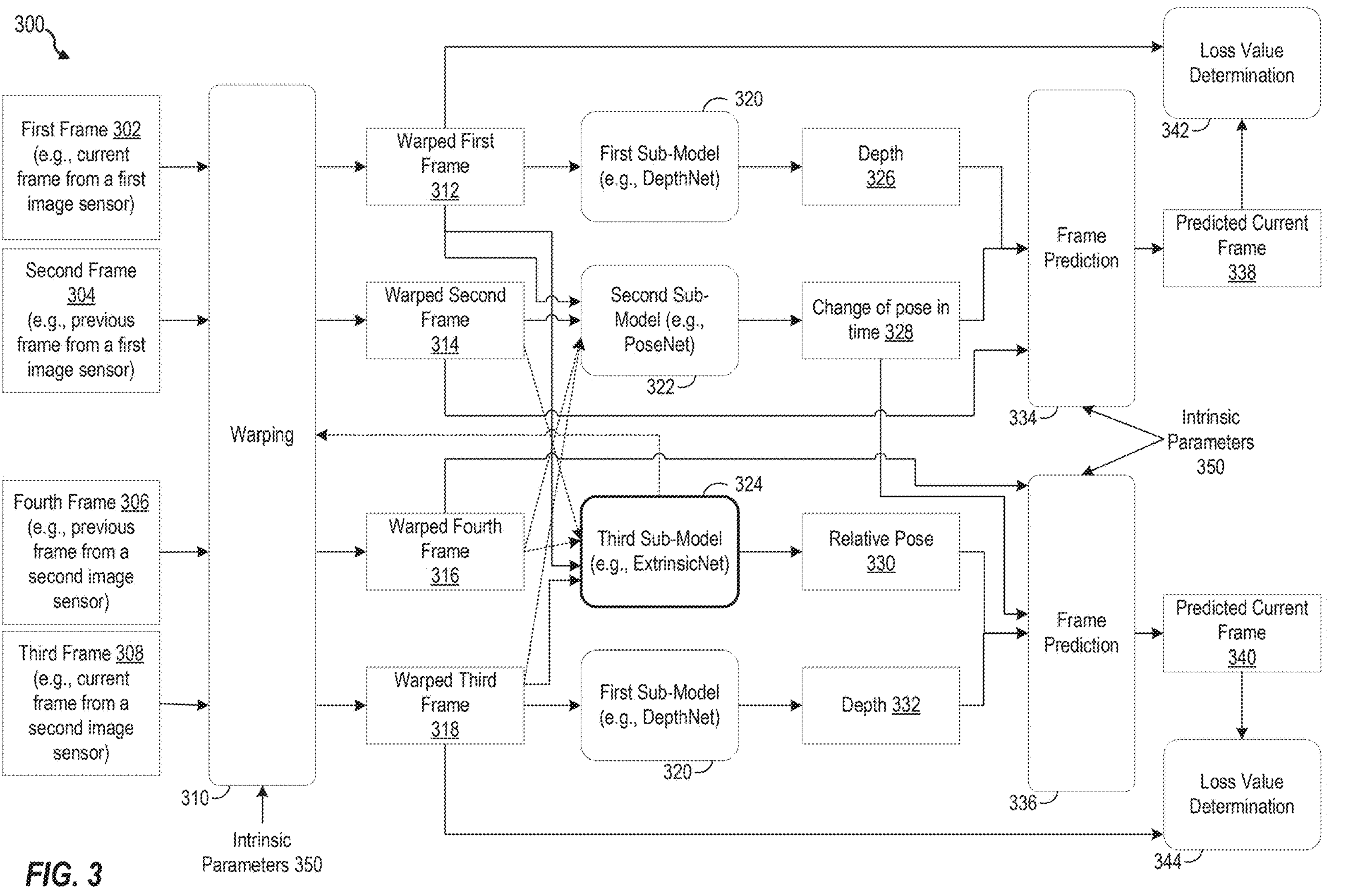
FIG. 3 depicts example training of a ML model to at least train the ML model to perform image sensor extrinsic parameter prediction.

FIG. 3 depicts example training 300 of a ML model to at least train the ML model to perform image sensor extrinsic parameter prediction. More specifically, the ML model may be trained to predict a relative pose of an image sensor with respect to another image sensor, such as where the two image sensors are mounted at, or on, an object. The object may be a moving object, such as an autonomous vehicle.

As shown in FIG. 3, training the ML model may include training the ML model to (1) perform depth estimation using a first sub-model 320, (2) perform motion estimation using a second sub-model 322, (3) perform relative pose estimation using a third sub-model 324, and (4) perform frame prediction based on the estimated depth 326, the estimated depth 332, the estimated motion, or the estimated change in pose in time 328 of an image sensor, and/or an estimated relative pose 330.

Training the ML model may begin by initializing the ML model with one or more parameters (e.g., weights, connections, a number of hidden nodes, weight decay, etc.). For example, each of the first sub-model 320, the second sub-model 322, and the third sub-model 324 of the ML model may be initialized with a first respective set of parameters.

In the example illustrated in FIG. 3, each instance of first sub-model 320 may represent the same first sub-model. That is, the first instance of the first sub-model 320 and the second instance of the first sub-model 320 may share the same sub-model 320 and parameter values. However, it is noted, that in some other examples, each instance of the first sub-model 320, shown in FIG. 3, may represent different sub-models with different parameter values. For example, the first image sensor may the second image sensor may be mounted on a same vehicle. The first image sensor may be mounted at the front of the vehicle and the second image sensor may be mounted on a side of the vehicle; thus, the first image sensor and the second image sensor may not capture the same type of scene. As such, by using different second sub-models (e.g., different instances of second sub-model 320) for the image sensors, one sub-model, associated with the first image sensor, may be able to learn the scene captured by the first image sensor and the other sub-model, associated with the second image sensor, may be able to learn the scene captured by the second image sensor. This may allow for improved accuracy and/or selectivity, and/or may be useful in cases where the ML model architecture is small/limited.

Further, in the example illustrated in FIG. 3, although only one instance of second sub-model 322 and one instance of third sub-model 324 is shown, in some other examples, multiple instances of the second sub-model 322 and/or the third sub-model 324 may be associated with the ML model. Multiple instances of the second sub-model 322 may represent the same second sub-model 322 or different second sub-models 322 with different parameter values. Multiple instances of the third sub-model 324 may represent the same third sub-model 324 or different third sub-models 324 with different parameter values.

Multiple training data instances may be used to train the ML model. Each training data instance may include a least three frames. For example, a training data instance may include a first frame and a second frame generated by a same image sensor at different time periods. For example, the first frame of the training data instance may include a 2D image of a 3D space captured by an image sensor at time T=x, and the second frame of the training data instance may include a 2D image of the same 3D space captured by the same image sensor but at time T=0. Time T=x may occur later in time than time T=0. Thus, the first frame may represent a current frame at the current time T=x, while the second frame may represent a previous frame at a previous time T=0. The training data instance may also include a third frame generated by a different image sensor. For example, the third frame of the training data instance may include a 2D image of a 3D space captured by the other image sensor, also at time T=x (similar to the first frame). The image sensors may be synchronized in time.

In certain aspects, the training data instance may also include one additional frame, e.g., a fourth frame. The fourth frame of the training data instance may include a 2D image of the same 3D space captured at the third frame, captured by the other image sensor, also at time T=0 (similar to the second frame).

Training the ML model using an example training data instance, including a first frame 302, a second frame 304, a third frame 308, and a fourth frame 306, is depicted in FIG. 3.

First frame 302 and second frame 304 may be frames generated by a first image sensor. For illustration, the first frame 302 may be a 2D image capturing a scene in front of a car that is generated by the first image sensor, which is a front-viewing image sensor on an autonomous vehicle. Further, for illustration, the second frame 304 may be a 2D image also capturing the scene in front of the car, which is generated by the first image sensor earlier in time than the first frame 302. In particular, the first frame 302 may be generated by the first image sensor at a first time period, and the second frame 304 may generated by the first image sensor at a second time period (e.g., the first time period is later in time than the second time period).

Third frame 308 and fourth frame 306 may be frames generated by a second image sensor. For illustration, the third frame 308 may be a 2D image capturing a scene behind a car that is generated by the second image sensor, which is a rear-viewing image sensor on the same autonomous vehicle as the first image sensor. Further, for illustration, the fourth frame may be a 2D image also capturing the scene behind the car, which is also generated by the second image sensor. The third frame 308 may be generated by the second image sensor at the second time period and the fourth frame

306 may be generated by the second image sensor at the first time period (e.g., where the first time period is later in time than the second time period).

To train the ML model, the first frame 302, the second frame 304, the third frame 308, and/or the fourth frame 306 may first be warped. Image warping at 310 may transform the first frame 302 into warped first frame 312, transform the second frame 304 into warped second frame 314, transform the third frame 308 into warped third frame 318, and/or transform the fourth frame 306 into warped fourth frame 316.

In certain aspects, image warping at 310 may be based on intrinsic parameters 350 associated with both of the first image sensor (e.g., associated with first frame 302 and second frame 304) and second image sensor (e.g., associated with third frame 308 and fourth frame 306. In certain aspects, image warping at 310 may also be based on extrinsic parameters associated with both of the first image sensor and the second image sensor. Different from FIG. 2, in FIG. 3 however, the extrinsic parameters may be predicted via third sub-model 324, such as during training.

Training the ML model may then proceed with predicting depth information (simply referred to herein as "depth 326") for the warped first frame 312. For example, first sub-model 320, e.g., DepthNet, of the ML model may be used to process the warped first frame 312 and generate depth 326 as output. Depth 326 may indicate the distance of each pixel in warped first frame 312 from the first image sensor (e.g., such as at the first time period when first frame 302 was generated by the first image sensor).

Depth information (simply referred to herein as "depth 332") may also be predicted for the warped third frame 318. For example, first sub-model 320, e.g., DepthNet, of the ML model may be used to process the warped third frame 318 and generate depth 332 as output. Depth 332 may indicate the distance of each pixel in warped third frame 318 from the second image sensor (e.g., such as at the first time period when third frame 308 was generated by the second image sensor).

Training the ML model may also proceed with predicting a change of pose in time 328. The change of pose in time 328 may indicate the change of the first image sensor pose over time. For example, second sub-model 322, e.g., PoseNet, of the ML model may be used to process the warped first frame 312 and the warped second frame 314 to generate the change of pose in time 328. In this example, change of pose in time 328 may indicate the predicted change in pose of the first image sensor from the second time period (e.g., when second frame 304 was generated by the first image sensor) to the first time period (e.g., when first frame 302 was generated by the first image sensor). This change of pose in time 328 may indicate the motion of the first image sensor from the second time period to the first time period.

Different from FIG. 2, training the ML model in FIG. 3 may also proceed with predicting a relative pose 330 between the first image sensor and the second image sensor. For example, third sub-model 324, e.g., ExtrinsicNet, of the ML model may be used to process the warped third frame 318 and the warped first frame 312 (e.g., both associated with the first time period) and generate relative pose 330 as output. Relative pose 330 may indicate the pose of the second image sensor with respect to the first image sensor. In certain aspects, third-sub model 324 may be an example multilayer CNN. In certain aspects, third-sub model 324 may be an example vision transformer. In certain aspects, the third sub-model 324 may output different representations of the relative pose 330. For example, the third sub-model 324 may output the relative pose 330 as a 4×4 matrix, as a combination of translations and angles, as quaternions, and/or the like.

Training the ML model may then proceed with performing frame prediction 334 and frame prediction 336.

Frame prediction 334 may include processing depth 326, the change of pose in time 328, and, in some cases, warped second frame 314 to generate a predicted current frame 338. The predicted current frame 338 may represent the first frame 302, as predicted by the ML model. In certain aspects, the frame prediction 334 may rely on geometric computation from the input (e.g., depth 326, change in pose in time 328, and warped second frame 314) to generate the predicted current frame 338.

In certain aspects, frame prediction 334 may further rely on intrinsic parameters 350. For example, the predicted current frame 338 may be computed (or simulated) by projecting 3D data of the world into the second image sensor with known relative pose 330 (e.g., from third sub-model 324). In such a projection, information of intrinsic parameters 350, such as lens distortion and/or focal length, may be utilized. Additionally, the predicted current frame 338 may be computed (or simulated) by computing the inverse projection of intensity values or colors in the warped second frame 314, which may be based on intrinsic parameters 350.

Frame prediction 336 may include processing depth 332, the change of pose in time 328, the relative pose 330, and, in some cases, warped fourth frame 316 to generate a predicted current frame 340. The predicted current frame 340 may represent the third frame 308, as predicted by the ML model. In certain aspects, frame prediction 336 may further rely on intrinsic parameters 350.

In certain aspects, frame prediction 334 and/or frame prediction 336 may further rely on a motion of a moving object to generate the predicted current frame 338 and/or the predicted current frame 340, respectively. The motion of the moving object may indicate a speed and yaw rate of the moving object, such as from the second time period (e.g., associated with the second frame 304 or the fourth frame 306) to the first time period (e.g., associated with first frame 302 or third frame 308). In certain aspects, the motion of the moving object may represent the ego motion of the moving object. Ego motion may refer to the movement of a moving object, such as a vehicle, relative to the ground/road. In certain aspects, the motion of the moving object may be measured by one or more sensors, such as one or more inertial measurement units (IMUs) and/or one or more LIDAR sensors, associated with the moving object.

Loss value determination 342 and loss value determination 344 may then be performed to determine whether to modify one or more parameters of the ML model.

For example, loss value determination 342 may include evaluating the similarity of the predicted current frame 338 to the warped first frame 312, and determining a loss value based on the evaluation. In certain aspects, loss value determination 342 is performed using a loss function. The loss function may be configured to adjust the loss value determined at loss value determination 342 based on some error between the predicted current frame 338 and the warped first frame 312. For example, greater error between the predicted current frame 338 and the warped first frame 312 may result in a greater loss value determined than where the photometric error is less.

Similarly, loss value determination 344 may include evaluating the similarity of the predicted current frame 340 to the warped third frame 318, and determining a loss value based on the evaluation. In certain aspects, loss value determination 344 is performed using a loss function. The loss function may be configured to adjust the loss value determined at loss value determination 344 based on some error between the predicted current frame 340 and the warped third frame 318. For example, greater error between the predicted current frame 340 and the warped third frame 318 may result in a greater loss value determined than where the error is less.

Example loss functions and error used in FIG. 3 are similar to the loss functions and error described in detail above with respect to FIG. 2.

In certain aspects, multiple training data instances are used to train the ML model. For example, multiple training data instance may be provided as input into the ML model to (1) generate depths 326, 332, (2) generate changes of pose in time 328, (3) generate relative poses 330, (4) generate predicted current frames 338, 340, (5) determine loss values, and, in some cases, (6) modify parameter(s) of the ML model. Training the ML model may be complete when all available training input (e.g., training data instances) have been used to train the ML model and/or when a training termination condition is reached for the model.

In certain aspects, as illustrated by the dotted lines in FIG. 3, additional prediction(s) may be made by the ML model to supplement the input processed for frame prediction 334 and/or frame prediction 336.

For example, in certain aspects, the ML model may predict a second change of pose in time (not shown in FIG. 3). The second change of pose in time may indicate the change of the second image sensor pose over time. For example, second sub-model 322, e.g., PoseNet, of the ML model may be used to process the warped third frame 318 and the warped fourth frame 316 (shown via the dotted lines in FIG. 3) to generate the second change of pose in time. In this example, the second change of pose in time may indicate the predicted change in pose of the second image sensor from the second time period (e.g., when fourth frame 306 was generated by the second image sensor) to the first time period (e.g., when third frame 308 was generated by the second image sensor). This second change of pose in time may indicate the motion of the second image sensor from the second time period to the first time period. This second change of pose in time may be processed as an additional input for frame prediction 334 and/or frame prediction 336.

In certain aspects, the ML model may predict a second relative pose (not shown in FIG. 3). For example, third sub-model 324, e.g., ExtrinsicNet, of the ML model may be used to process the warped second frame 314 and the warped fourth frame 316 (e.g., both associated with the second time period) (shown via the dotted lines in FIG. 3) and generate a second relative pose as output. The second relative pose 330 may indicate the pose of the second image sensor with respect to the first image sensor. The second relative pose may indicate another predicted pose of the second image sensor with respect to the first image sensor, such as at the second time period. This second relative pose may be processed as an additional input for frame prediction 334 and/or frame prediction 336.

While FIG. 3 depicts the third sub-model 324 processing two (warped) frames to generate relative pose 330, in certain other aspects, a third sub-model (e.g., ExtrinsicNet) may process a single frame to generate relative pose. A sub-model of the ML model processing a single frame to generate relative pose is depicted and described with respect to FIG. 4.

Figure 4:
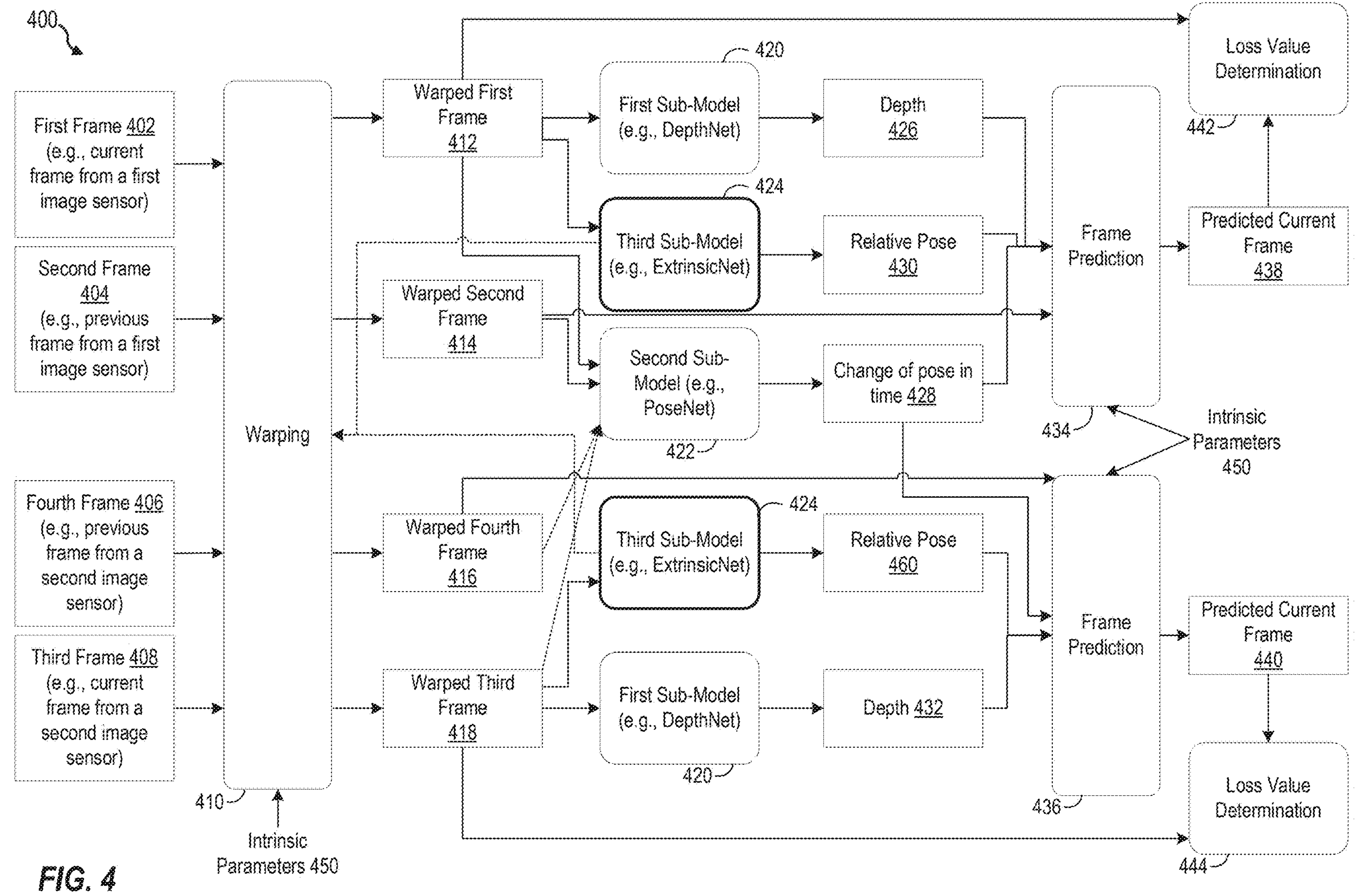
FIG. 4 depicts another example training for an ML model to at least train the ML model to perform image sensor extrinsic parameter prediction.

Similar to FIG. 3, in FIG. 4 which depicts another example training 400 for an ML model, a training data instance used to train the ML model may include three or four frames: a first frame 402, a second frame 404, a third frame 408, and a fourth frame 406. First frame 402 may be similar to first frame 302 in FIG. 3, second frame 404 may be similar second frame 304 in FIG. 3, third frame 408 may be similar to third frame 308 in FIG. 3, and fourth frame 406 may be similar to fourth frame 306 in FIG. 3.

In certain aspects, image warping 410 may be used to transform first frame 402 to warped first frame 412, transform second frame 404 to warped second frame 414, transform third frame 408 to warped third frame 418, and/or transform fourth frame 406 to warped fourth frame 416. In certain aspects, image warping 410 may be based on intrinsic parameters 450 associated with both of the first image sensor (e.g., associated with first frame 402 and second frame 404) and second image sensor (e.g., associated with third frame 408 and fourth frame 406). In certain aspects, image warping 410 may be based on extrinsic parameters predicted by third sub-model 424 (as shown by the dotted lines to warping at 410 in FIG. 4).

Training the ML model may include predicting depth information (simply referred to herein as "depth 426") for the warped first frame 412. For example, first sub-model 420, e.g., DepthNet, of the ML model may be used to process the warped first frame 412 and generate depth 426 as output.

Depth information (simply referred to herein as "depth 432") may also be predicted for the warped third frame 418. For example, first sub-model 420, e.g., DepthNet, of the ML model may be used to process the warped third frame 418 and generate depth 432 as output.

Training the ML model may also include predicting one or more changes of pose in time 428. For example, second sub-model 422, e.g., PoseNet, of the ML model may be used to process the warped first frame 412 and the warped second frame 414 to generate a first change of pose in time 428. In this example, the first change of pose in time 428 may indicate the predicted change in pose of the first image sensor from the second time period (e.g., when second frame 404 was generated by the first image sensor) to the first time period (e.g., when first frame 402 was generated by the first image sensor). This first change of pose in time 428 may indicate the motion of the first image sensor from the second time period to the first time period.

Additionally, in certain aspects, second sub-model 422, e.g., PoseNet, of the ML model may be used to process the warped third frame 418 and the warped fourth frame 416 (as shown by the dotted lines to second sub-model 422 in FIG. 4) to generate a second change of pose in time (not shown in FIG. 4). In this example, the second change of pose in time may indicate the predicted change in pose of the second image sensor from the second time period to the first time period (e.g., when third frame 408 was generated by the second image sensor). This second change of pose in time may indicate the motion of the second image sensor from the second time period to the first time period. In certain aspects, the second change of pose in time may be processed as an input for frame prediction 434 and/or frame prediction 436.

Training the ML model may also include predicting a first relative pose 430 of the first image sensor and/or the second image sensor with respect to a scene and/or real-world environment. This is different than FIG. 3 where training the ML model includes predicting a relative pose of the second image sensor with respect to the first image sensor, or vice versa (e.g., relative pose with respect to one another).

For example, third sub-model 424, e.g., ExtrinsicNet, of the ML model may be used to process the warped first frame 412 (e.g., associated with the first time period) and generate a first relative pose 430 as output. The first relative pose 430 may indicate the pose of the first image sensor with respect to a scene and/or real-world environment, such as at the first time period. For example, the first relative pose 430 may indicate a pitch of the first image sensor with respect to a horizon.

Similarly, third sub-model 424, e.g., ExtrinsicNet, of the ML model may be used to process the warped third frame 418 (e.g., associated with the first time period) and generate a second relative pose 460 as output. The second relative pose 460 may indicate the pose of the second image sensor with respect to a scene and/or real-world environment, such as at the first time period. For example, the second relative pose 460 may indicate a pitch of the second image sensor with respect to the horizon.

Training the ML model may then proceed with performing frame prediction 434, performing frame prediction 436, performing loss value determination 442, and performing loss value determination 444. Frame prediction 434 may include processing depth 426, the first change of pose in time 428, the first relative pose 430, and, in some cases, warped second frame 414, to generate a predicted current frame 438. Frame prediction 436 may include processing depth 432, the first change of pose in time 428 (and/or the second change of pose in time 428), the second relative pose 460, and in some cases, the warped fourth frame 416 to generate a predicted current frame 440.

In certain aspects, frame prediction 434 and/or frame prediction 436 may further rely on a motion of a moving object to generate the predicted current frame 438 and/or the predicted current frame 440, respectively. The motion of the moving object may indicate a speed and yaw rate of the moving object, such as from the second time period (e.g., associated with the second frame 404 or the fourth frame 406) to the first time period (e.g., associated with first frame 402 or third frame 408). In certain aspects, the motion of the moving object may represent the ego motion of the moving object. In certain aspects, the motion of the moving object may be measured by one or more sensors, such as one or more IMUs and/or one or more LIDAR sensors, associated with the moving object.

One or more parameters of the ML model may be modified based on the loss value(s) determined during loss value determination 442 and/or loss value determination 444.

Example loss functions and error used in FIG. 4 are similar to the example loss functions and error described in detail above with respect to FIG. 2.

In the example illustrated in FIG. 4, each instance of first sub-model 420 may represent the same first sub-model. That is, the first instance of the first sub-model 420 and the second instance of the first sub-model 420 may share the same sub-model 420 and parameter values. However, it is noted, that in some other examples, each instance of the first sub-model 420, shown in FIG. 4, may represent different sub-models with different parameter values.

Further, in FIG. 4, each instance of third sub-model 424 may represent the same third sub-model. That is, the first instance of the third sub-model 424 and the second instance of the third sub-model 424 may share the same sub-model 424 and parameter values. However, it is noted, that in some other examples, each instance of the third sub-model 424, shown in FIG. 4, may represent different sub-models with different parameter values.

Further, in the example illustrated in FIG. 4, although only one instance of second sub-model 422 is shown, in some other examples, multiple instances of the second sub-model 422 may be associated with the ML model. Multiple instances of the second sub-model 422 may represent the same second sub-model 422 or different second sub-models 422 with different parameter values.

Figure 5A:
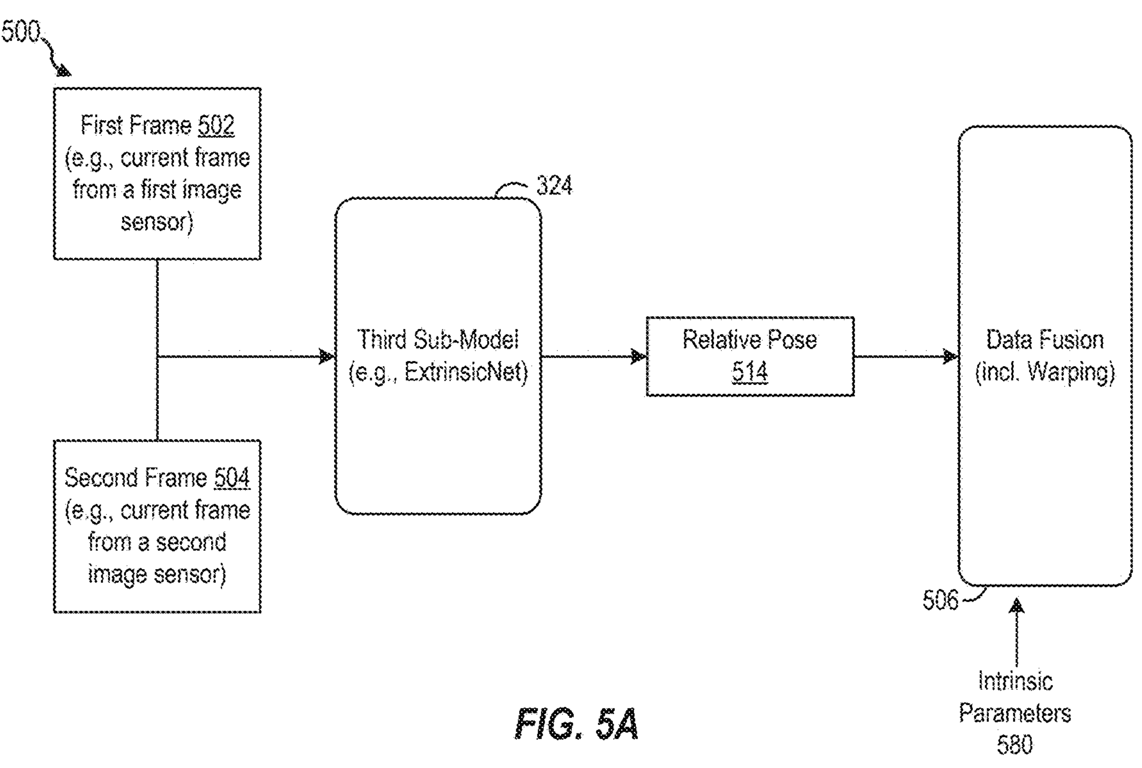
FIGS. 5A and 5B depict example image sensor extrinsic parameter prediction.
Figure 5B:
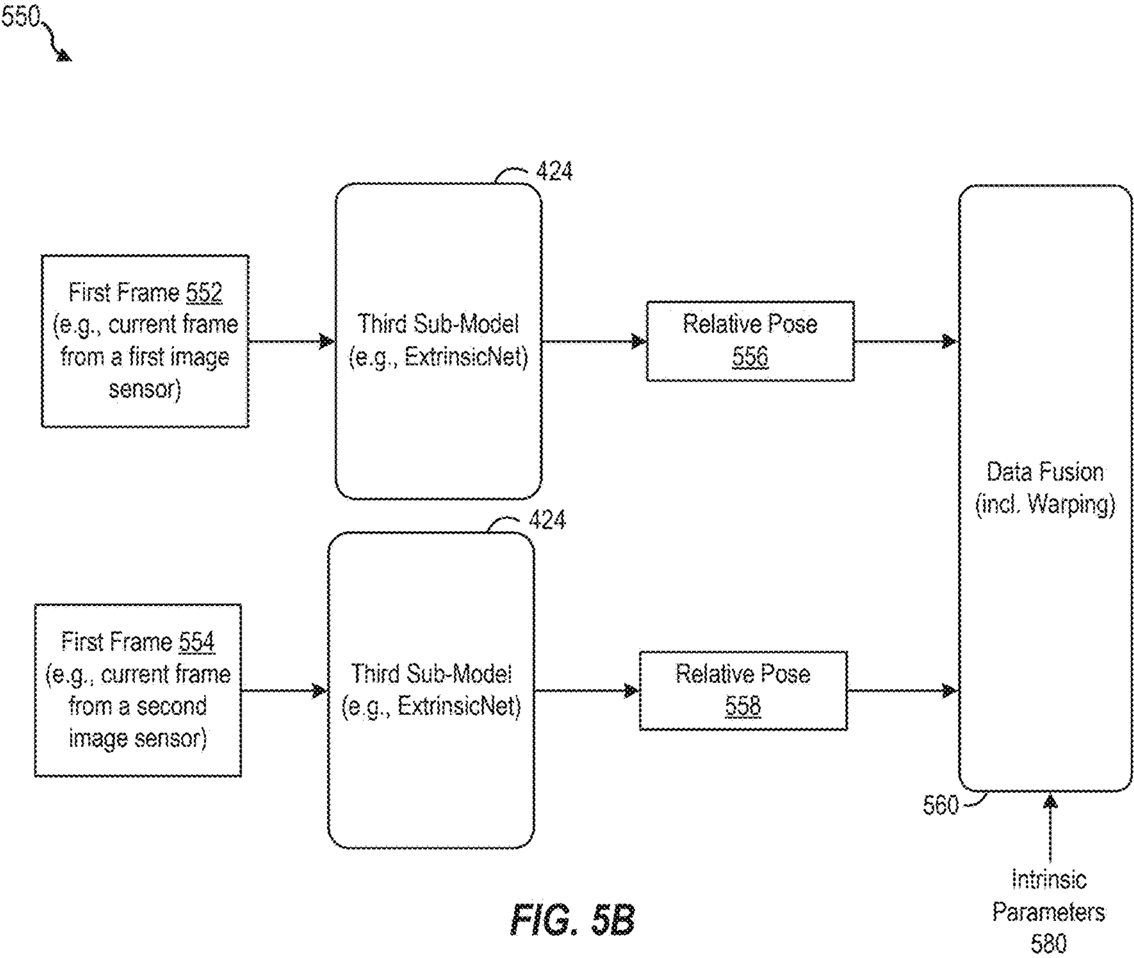

Following training of the ML model, such as shown in FIG. 3 and/or FIG. 4, the third sub-model 324, 424 (e.g., ExtrinsicNet) may be extracted from the ML model and used independently for relative pose prediction. For example, third-sub model 324 may be used independently to predict relative pose between image sensors, such as shown in FIG. 5A. As another example, third sub-model 424 may be used independently to predict relative pose of an image sensor with respect to a scene, such as shown in FIG. 5B.

For example, FIG. 5A depicts example image sensor extrinsic parameter prediction 500 (e.g., inferencing) for a second image sensor relative to a first image sensor. As shown in FIG. 5A, a first frame 502 and a second frame 504 may be obtained. The first frame 502 may include a 2D image of a 3D scene captured by the first image sensor. The first frame 502 may be associated with a first time period. The second frame 504 may include a 2D image of a 3D scene captured by the second image sensor. The second frame 504 may also be associated with the first time period. In certain aspects, the first image sensor and the second image senor are cameras installed at, or on, a vehicle. The first image sensor and the second image sensor may be synchronized in time.

A third sub-model 324, such as trained according to the techniques described in FIG. 3, may process the first frame 502 and the second frame 504 to predict a relative pose 514 between the first image sensor and the second image sensor. For example, the third sub-model 324 may predict a relative pose 514 of the second image sensor with respect to the first image sensor, or vice versa, such as at the first time period.

In certain aspects, the relative pose 514 may be used to fuse the first frame 502 with the second frame 504 during data fusion at 506. For example, image data of the first frame 502 may be fused and correlated with the image data of the second frame 504. In certain aspects, the data fusion may include warping, which may rely on intrinsic parameters 580 associated with the first image sensor and the second image sensor.

As another example, FIG. 5B depicts example image sensor extrinsic parameter prediction 550 (e.g., inferencing) for a first image sensor and/or a second image sensor relative to a scene/environment and for a second image sensor relative to the scene/environment. As shown in FIG. 5B, a first frame 552 and a second frame 554 may be obtained. The first frame 552 may include a 2D image of a 3D scene captured by the first image sensor. The first frame 552 may be associated with a first time period. The second frame 554 may include a 2D image of a 3D scene captured by the second image sensor. The second frame 554 may also be associated with the first time period. In certain aspects, the first image sensor and the second image senor are cameras installed at, or on, a vehicle.

A third sub-model 424, such as trained according to the techniques described in FIG. 4, may process the first frame 552, independently, to predict a relative pose 556 of the first image sensor with respect to the scene/environment at the first time period. The third sub-model 424 may also process the second frame 554, independently, to predict a relative pose 558 of the first image sensor with respect to the scene/environment at the first time period.

In certain aspects, the relative pose 556 and the relative pose 558 may be used to fuse the first frame 552 with the second frame 554 during data fusion at 560. For example, image data of the first frame 552 may be fused and correlated with the image data of the second frame 554. In certain aspects, the data fusion may include warping, which may rely on intrinsic parameters 580 associated with the first image sensor and the second image sensor.

Figure 6:
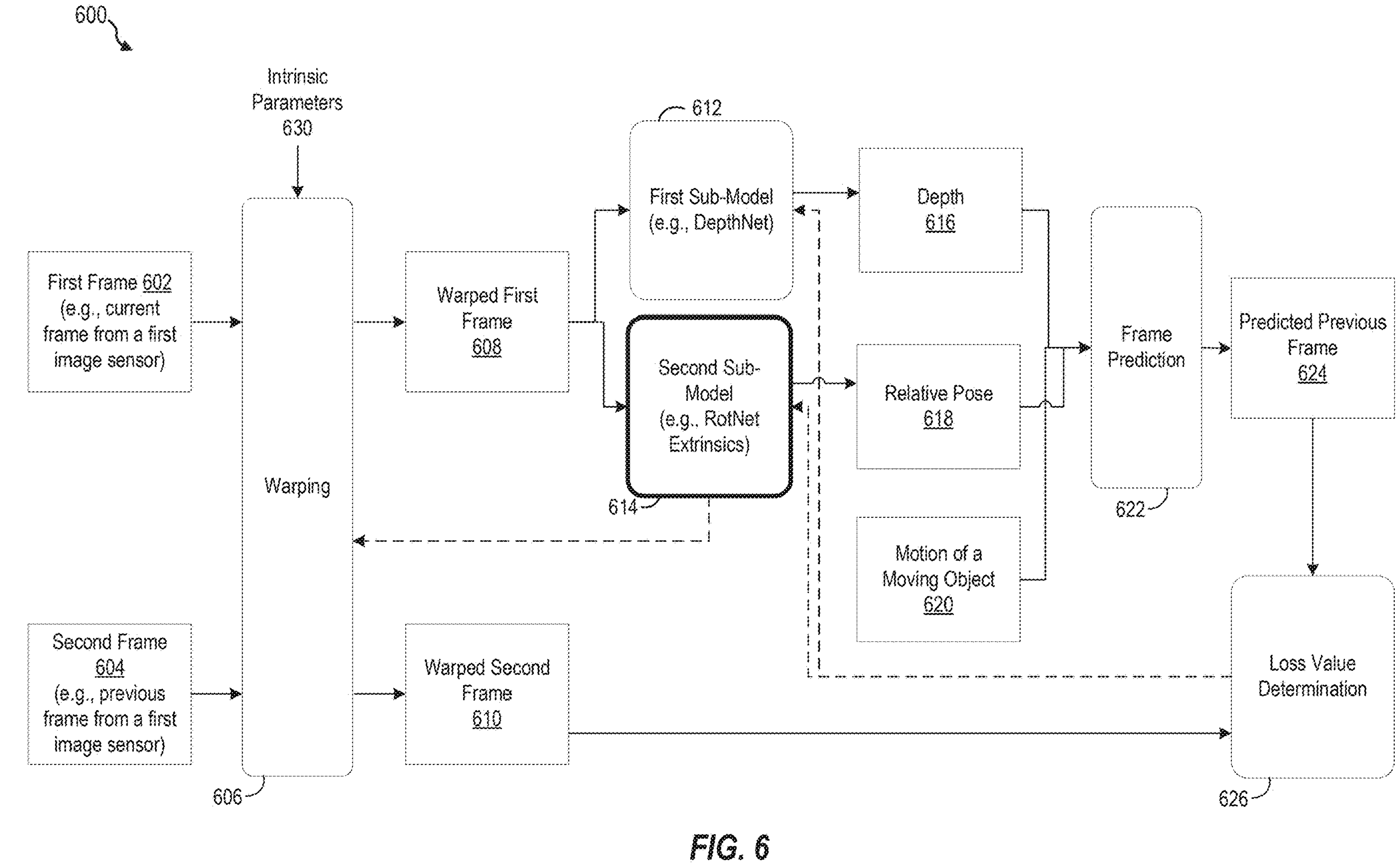
FIG. 6 depicts another example training for an ML model to at least train the ML model to perform image sensor extrinsic parameter prediction.

While FIGS. 3 and 4 provide methods for training an ML model to predict image sensor extrinsic parameters based on frames from at least two image sensors, in certain other aspects described herein, an ML model may be trained to predict image sensor extrinsic parameters based on frames from a single image sensor. FIG. 6 depicts example training of an ML model to at least train the ML model to perform image sensor extrinsic parameter prediction based on frames from a single image sensor. More specifically, the ML model may be trained to predict a relative pose of an image sensor with respect to another object, such as a moving object. For example, the ML model may be trained to predict a relative pose of a camera with respect to a vehicle where the camera is mounted.

As shown in FIG. 6, training the ML model may include training the ML model to (1) perform depth estimation using a first sub-model 612, (2) perform relative pose estimation using a second sub-model 614, and (3) perform frame prediction based on the estimated depth 616, the estimated relative pose 618, and a motion of a moving object 620 (e.g., that is associated with an image sensor).

Training the ML model may begin by initializing the ML model with one or more parameters (e.g., weights, connections, a number of hidden nodes, weight decay, etc.). For example, each of the first sub-model 612 and the second sub-model 614 may be initialized with a first respective set of parameters.

Multiple training data instances may be used to train the ML model. Each training data instance may include two frames. For example, a training data instance may include a first frame and a second frame generated by a same image sensor at different time periods. For example, the first frame of the training data instance may include a 2D image of a 3D space captured by an image sensor at time T=x, and the second frame of the training data instance may include a 2D image of the same 3D space captured by the same image sensor but at time T=0.

Training the ML model using an example training data instance, including a first frame 602 and a second frame 604, is depicted in FIG. 6.

First frame 602 and second frame 604 may be frames generated by a first image sensor. For illustration, the first frame 602 may be a 2D image capturing a scene in front of a car that is generated by the first image sensor, which is a front-viewing image sensor on an autonomous vehicle. Further, for illustration, the second frame 604 may be a 2D image also capturing the scene in front of the car, which is generated by the first image sensor earlier in time than the first frame 602. In particular, the first frame 602 may be generated by the first image sensor at a first time period, and the second frame 604 may generated by the first image sensor at a second time period (e.g., the first time period is later in time than the second time period).

To train the ML model, the first frame 602 and the second frame 604 may first be warped. Image warping at 606 may transform the first frame 602 into warped first frame 608 and transform the second frame 604 into warped second frame 610. In certain aspects, image warping at 606 may be based on intrinsic parameters 630 associated with the first image sensor. In certain aspects, image warping at 606 may be based on extrinsic parameters predicted for the first image sensor by second sub-model 614 (as shown by the dotted line in FIG. 6).

Training the ML model may then proceed with predicting depth information (simply referred to herein as "depth 616") for the warped first frame 608. For example, first sub-model 612, e.g., DepthNet, of the ML model may be used to process the warped first frame 608 and generate depth 616 as output. Depth 616 may indicate the distance of each pixel in warped first frame 608 from the first image sensor (e.g., such as at the first time period when first frame 602 was generated by the first image sensor).

Training the ML model may also proceed with predicting a relative pose 618 between the first image sensor and a moving object. For example, second sub-model 614, e.g., RotNet Extrinsics, of the ML model may be used to process the warped first frame 608 and generate relative pose 618 as output. Relative pose 618 may indicate the pose of the second image sensor with respect to the moving objects (e.g., first image sensor rotation relative to the motion of the moving object).

In certain aspects, second sub-model 614, e.g., RotNet Extrinsics, of the ML model may be used to process the warped first frame 608 and estimate rotation. That is, sometimes the change in position, such as due to aging, may be negligible compared to the change in rotation and thus may not need to be updated dynamically.

Training the ML model may then proceed with performing frame prediction 622. Frame prediction 622 may include processing depth 616, relative pose 618, and a motion of the moving object 620 to generate a predicted previous frame 624. The motion of the moving object 620 may indicate a speed and yaw rate of the moving object, such as from the second time period (e.g., associated with the second frame 604) to the first time period (e.g., associated with first frame 602). The motion of the moving object 620 may be obtained by the ML model. In certain aspects, the motion of the moving object 620 may represent the ego motion of the moving object. Ego motion may refer to the movement of a moving object, such as a vehicle, relative to the ground/road. In certain aspects, optical flow may be used to calculate the velocity of the moving object relative to the ground/road. In certain aspects, the motion of the moving object 620 may be measured by one or more sensors, such as one or more IMUs and/or one or more LIDAR sensors, associated with the moving object. In certain aspects, frame prediction 622 may further include processing a known location of the first image sensor with respect to the moving object (e.g., location on the moving object where the first image sensor is mounted).

The predicted previous frame 624, predicted via frame prediction 622, may represent the second frame 604, as predicted by the ML model.

Loss value determination 626 may then be performed to determine whether to modify one or more parameters of the ML model. For example, loss value determination 626 may include evaluating the similarity of the predicted previous frame 624 to the warped second frame 610 (e.g., the actual warped previous frame), and determining a loss value based on the evaluation. In certain aspects, loss value determination 626 is performed using a loss function. The loss function may be configured to adjust the loss value determined at loss value determination 626 based on some error between the predicted previous frame 624 and the warped second frame 610. For example, greater error between the predicted previous frame 624 and the warped second frame 610 may result in a greater loss value determined than where the error is less.

Example loss functions and error used in FIG. 6 are similar to the example loss functions and error described in detail above with respect to FIG. 2.

In certain aspects, multiple training data instances are used to train the ML model. For example, multiple training data instances may be provided as input into the ML model to (1) generate depths 616, (2) generate relative poses 618, (3) generate predicted previous frames 624, (4) determine loss values, and, in some cases, (5) modify parameter(s) of the ML model. Training the ML model may be complete when all available training input (e.g., training data instances) have been used to train the ML model and/or when a training termination condition is reached for the ML model.

Following training of the ML model, such as shown in FIG. 6, the second sub-model 614 (e.g., RotNet Extrinsics) may be extracted from the ML model and used independently for relative pose prediction. For example, second sub-model 614 may be used independently to predict relative pose of image sensor(s) with respect to a scene, such as shown in FIG. 7.

Figure 7:
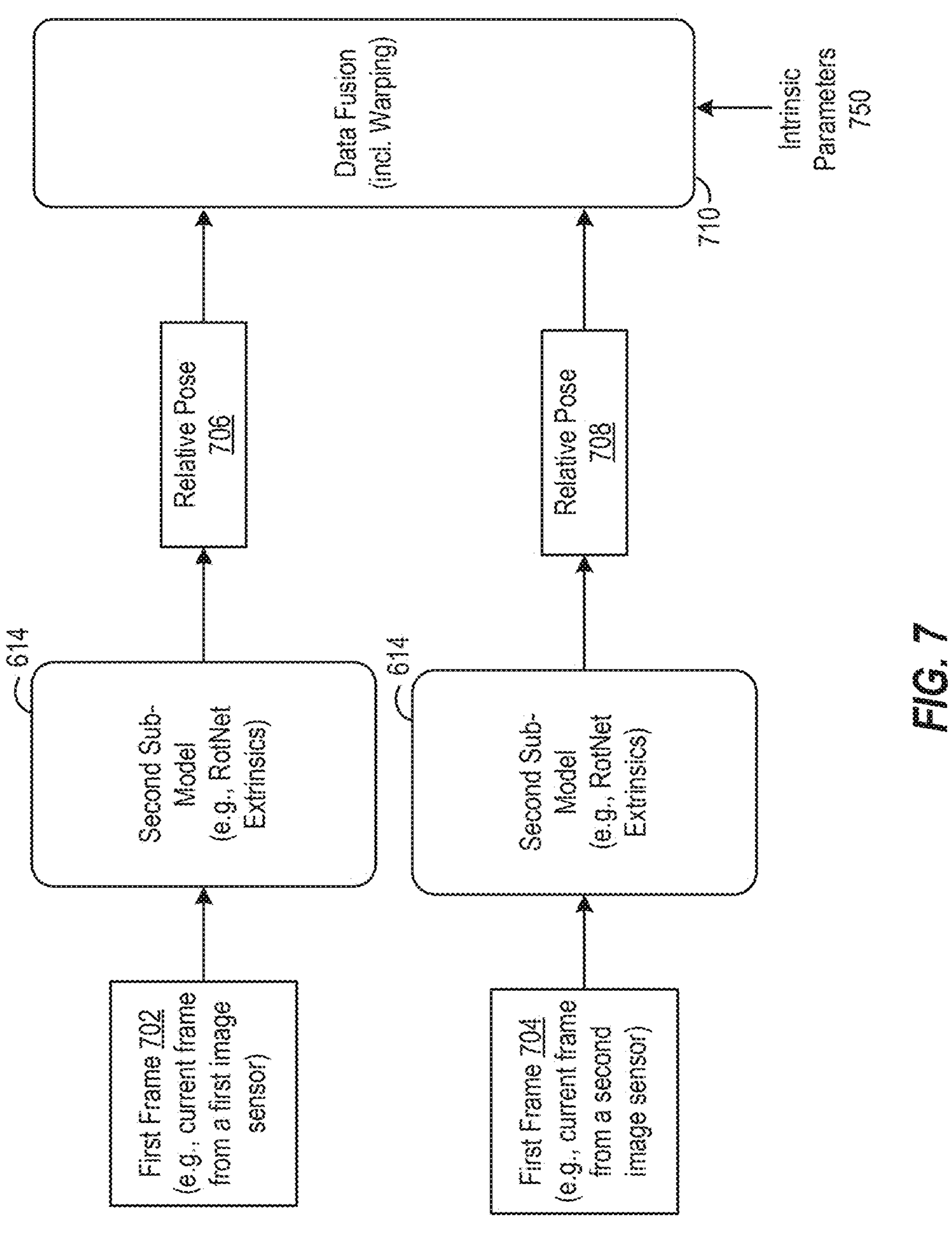
FIG. 7 depicts example image sensor extrinsic parameter prediction for an image sensor relative to an object.

For example, FIG. 7 depicts example image sensor extrinsic parameter prediction 700 (e.g., inferencing) for a first image sensor relative to a scene/environment and for a second image sensor relative to the scene/environment. As shown in FIG. 7, a first frame 702 and a second frame 704 may be obtained. The first frame 702 may include a 2D image of a 3D scene captured by the first image sensor. The first frame 702 may be associated with a first time period. The second frame 704 may include a 2D image of a 3D scene captured by the second image sensor. The second frame 704 may also be associated with the first time period. In certain aspects, the first image sensor and the second image senor are cameras installed at, or on, an object. The object may be a non-moving object or a moving object, such as an ego vehicle.

A second sub-model 614, such as trained according to the techniques described in FIG. 6, may process the first frame 702, independently, to predict a relative pose 706 of the first image sensor with respect to the object (e.g., the vehicle). The second sub-model 614 may also process the second frame 704, independently, to predict a relative pose 708 of the second image sensor with respect to the object.

In certain aspects, the relative pose 706 and the relative pose 708 may be used to fuse the first frame 702 with the second frame 704 during data fusion at 710. For example, image data of the first frame 702 may be fused and correlated with the image data of the second frame 704. In certain aspects, the data fusion may include warping, which may rely on intrinsic parameters 750 associated with the first image sensor and the second image sensor.

In certain aspects, training data instances used to train an ML model for at least image sensor extrinsic parameter prediction may be warped. For example, image warping may be used to rotate frames associated with training data instances such that tilt is removed (e.g., as if an image sensor, without tilt, generated the warped frames). Using warped frames for training may help to reduce the variation in the training data. Further, using warped frames for training may enable an ML model to predict differences in image sensor pitch to nominal instead of absolute pitch, which may be a simplified problem.

In certain aspects, the training data instances used to train the ML model may include frames captured by image sensors at different locations and/or rotations with respect to an object, such as a moving object (e.g., a vehicle). For example, training data instances may be generated based on capturing frames at different image sensor locations associated with a vehicle, such that the ML model may learn the different rotation angles, e.g., roll, yaw, and pitch. For example, for a forward mounted camera on a vehicle, roll angle may not be observable, and thus a frame captured by this camera and used to train the ML model may not adequately train the ML model to learn this particular rotation angle for an image sensor. In certain other aspects, supervised learning with known angles may be included in the training.

In certain aspects, prior to warping and/or processing each input frame (e.g., for training and/or for inferencing), dynamic objects may be removed from each input frame. For example, dynamic objects may be treated as outlier data and thus removed. Conventional techniques for removing dynamic objects from an input frame may be used. For example, in certain aspects, one or more ML models may be used to detect dynamic objects, such as vehicles and/or pedestrians, in an input frame for removal. In certain aspects, dynamic objects may be inferred from LiDAR 3D data, such as from multiple time instances (e.g., where LiDAR data is available), for removal. In certain aspects, some methods to estimate VO (e.g., camera motion) may be used to reveal region(s) of a frame where optical flow is not consistent with a static scene assumption, such as to detect dynamic objects for removal. One or more of these techniques may be used to detect regions(s) of an input frame where dynamic object(s) exist, such that these region(s) are ignored when computing a loss value (e.g., using a loss function, as described above).

In certain aspects, when training an ML model to at least predict image sensor extrinsic parameters, synthetic and/or real data with ground truth may be added and processed by the ML model to help speed up the ML model reaching convergence and/or to help regularize the sub-models of the ML model. For example, with supervised learning, ground truth, for one or more of depth, relative pose, and/or change of pose in time, may be available to use for training the ML model. When this ground truth is available, then another loss function may be used when training the ML model according to the training shown in FIG. 3, FIG. 4, and/or FIG. 6. For example, the additional loss function may be used to determine another loss value based on a difference between the ground truth and explicit output of the DepthNet, the ExtrinsicNet, the PoseNet, and/or the RotNet shown in FIG. 3, FIG. 4, and/or FIG. 6. For example, in FIG. 4, third sub-model 424 (e.g., ExtrinsicNet) may be used to output relative pose 460. The second loss function may then be used to determine a loss value based on the difference between the output relative pose 460 and the available ground truth (e.g., the true relative pose). This may help to achieve a faster convergence of the ML model, however, while requiring some ground truth.

Example Artificial Intelligence (AI) System for Frame Prediction and/or Camera Extrinsics Parameters Detection Certain aspects described herein may be implemented, at least in part, using some form of AO, e.g., the process of using an ML model to infer or predict output data based on input data. An example ML model may include a mathematical representation of one or more relationships among various objects to provide an output representing one or more predictions or inferences. Once an ML model has been trained, the ML model may be deployed to process data that may be similar to, or associated with, all or part of the training data and provide an output representing one or more predictions or inferences based on the input data.

ML is often characterized in terms of types of learning that generate specific types of learned models that perform specific types of tasks. For example, different types of machine learning include supervised learning, unsupervised learning, semi-supervised learning, and reinforcement learning.

Supervised learning algorithms generally model relationships and dependencies between input features (e.g., a feature vector) and one or more target outputs. Supervised learning uses labeled training data, which are data including one or more inputs and a desired output. Supervised learning may be used to train models to perform tasks like classification, where the goal is to predict discrete values, or regression, where the goal is to predict continuous values. Some example supervised learning algorithms include nearest neighbor, naive Bayes, decision trees, linear regression, support vector machines (SVMs), and artificial neural networks (ANNs).

Unsupervised learning algorithms work on unlabeled input data and train models that take an input and transform it into an output to solve a practical problem. Examples of unsupervised learning tasks are clustering, where the output of the model may be a cluster identification, dimensionality reduction, where the output of the model is an output feature vector that has fewer features than the input feature vector, and outlier detection, where the output of the model is a value indicating how the input is different from a typical example in the dataset. An example unsupervised learning algorithm is k-Means.

Semi-supervised learning algorithms work on datasets containing both labeled and unlabeled examples, where often the quantity of unlabeled examples is much higher than the number of labeled examples. However, the goal of a semi-supervised learning is that of supervised learning. Often, a semi-supervised model includes a model trained to produce pseudo-labels for unlabeled data that is then combined with the labeled data to train a second classifier that leverages the higher quantity of overall training data to improve task performance.

Reinforcement Learning algorithms use observations gathered by an agent from an interaction with an environment to take actions that may maximize a reward or minimize a risk. Reinforcement learning is a continuous and iterative process in which the agent learns from its experiences with the environment until it explores, for example, a full range of possible states. An example type of reinforcement learning algorithm is an adversarial network. Reinforcement learning may be particularly beneficial when used to improve or attempt to optimize a behavior of a model deployed in a dynamically changing environment, such as a wireless communication network.

ML models may be deployed in one or more devices (e.g., network entities such as base station(s) and/or user equipment(s)) to support various wired and/or wireless communication aspects of a communication system. For example, an ML model may be trained to identify patterns and relationships in data corresponding to a network, a device, an air interface, or the like. An ML model may improve operations relating to one or more aspects, such as transceiver circuitry controls, frequency synchronization, timing synchronization, channel state estimation, channel equalization, channel state feedback, modulation, demodulation, device positioning, transceiver tuning, beamforming, signal coding/decoding, network routing, load balancing, and energy conservation (to name just a few) associated with communications devices, services, and/or networks. AI-enhanced transceiver circuitry controls may include, for example, filter tuning, transmit power controls, gain controls (including automatic gain controls), phase controls, power management, and the like.

Aspects described herein may describe the performance of certain tasks and the technical solution of various technical problems by application of a specific type of ML model, such as an ANN. It should be understood, however, that other type(s) of AI models may be used in addition to or instead of an ANN. An ML model may be an example of an AI model, and any suitable AI model may be used in addition to or instead of any of the ML models described herein. Hence, unless expressly recited, subject matter regarding an ML model is not necessarily intended to be limited to just an ANN solution or machine learning. Further, it should be understood that, unless otherwise specifically stated, terms such "AI model," "ML model," "AI/ML model," "trained ML model," and the like are intended to be interchangeable.

Figure 8:
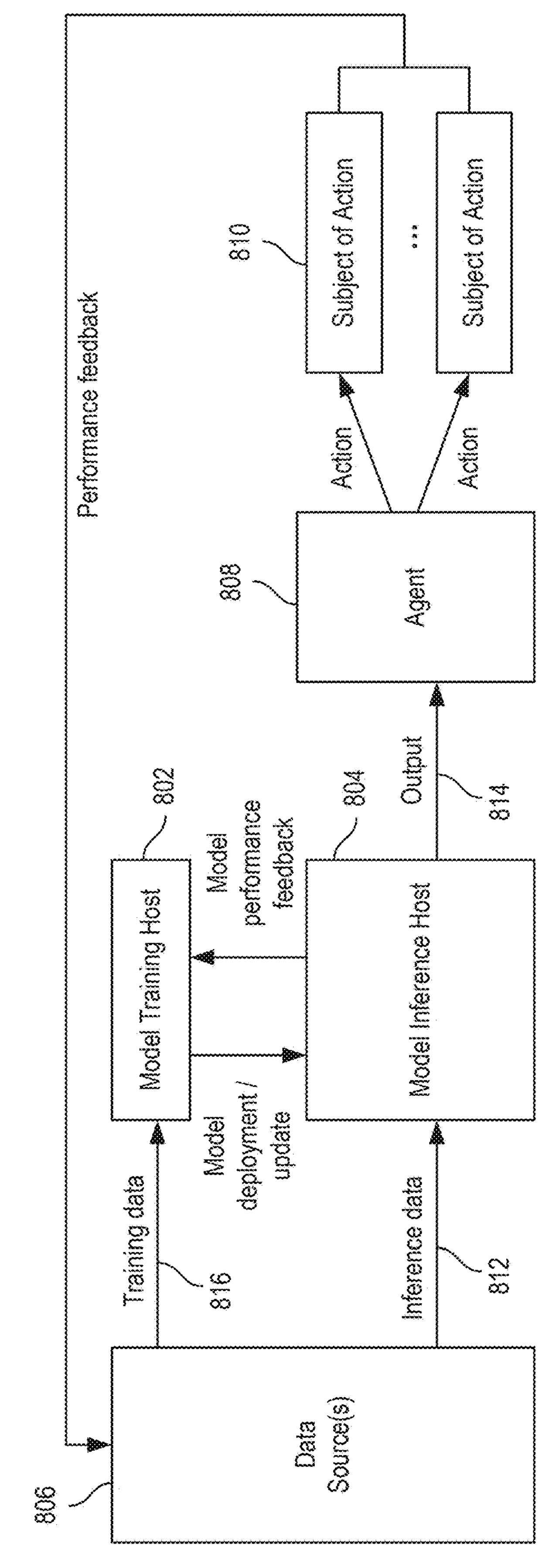
FIG. 8 depicts an example artificial intelligence (AI) architecture that may be used for frame prediction and/or image sensor extrinsic parameters prediction.

FIG. 8 is a diagram illustrating an example AI architecture 800 that may be used to implement the ML models (e.g., including the sub-models) described in this disclosure. As illustrated, the architecture 800 includes multiple logical entities, such as a model training host 802 for training the machine learning model with adaptive sampling and weighting strategies, a model inference host 804 for running inference using the trained model, data source(s) 806 providing training and inference data, and an agent 808 that utilizes the model's output. The model inference host 804, in the architecture 800, is configured to run an ML model based on inference data 812 provided by data source(s) 806. The model inference host 804 may produce an output 814 (e.g., predicted object identities and locations) based on the inference data 812, which is then provided as input to the agent 508.

The agent 808 may be an element or entity that utilizes the output of the machine learning model hosted by the model inference host 804. The agent 808 could be a software component, a hardware accelerator, or a system that leverages the object detection results produced by the model for various downstream tasks such as autonomous driving, surveillance, or robotics.

For example, if the output 814 from the model inference host 804 is a set of bounding boxes and class labels for detected objects in a video frame, the agent 808 may be an autonomous vehicle control system that uses the object detection information for navigation and obstacle avoidance. As another example, if the output 814 is a count of people in a surveillance video, the agent 808 could be a security monitoring application.

After receiving the output 814 from the model inference host 804, the agent 508 may determine how to utilize it. For instance, if the agent 808 is an autonomous driving system and the output is a set of detected vehicles and pedestrians, it may use this information to plan a safe trajectory. If the agent 508 decides to use the output 814, it may apply it to the subject of the action 810, which represents the data being processed or the system being controlled. In the autonomous driving example, the subject of action 810 would be the vehicle's motion control. In some cases, the agent 808 and subject of action 810 may be tightly integrated.

The data sources 806 may be configured to collect data used as training data 816 for the model training host 802 to train the adaptive sampling-based object detection models. The data sources 806 may also provide inference data 812 to the model inference host 804. This data could come from various entities and may include the subject of action 810. For example, for training an object detection model, the data sources 806 may collect video sequences with annotated object bounding boxes. The model training host 802 can then monitor the model's performance on this data to determine if retraining or fine-tuning with the adaptive sampling and weighting techniques is necessary to improve accuracy. In some cases, the agent 808 and the subject of action 810 are the same entity.

The data sources 806 may be configured for collecting data that is used as training data 816 for training the machine learning model with adaptive sampling, weighting, and/or object detection. The data sources 806 may also provide inference data 812 (also referred to as input data) for feeding the trained model during inference. In particular, the data sources 806 may collect data relevant to the object detection task at hand, such as video frames from cameras or sensors. This data may come from various sources, including the subject of action 810, which represents the data being processed by the model. The collected data is provided to the model training host 802 for training and fine-tuning the adaptive sampling-based model. For example, after the subject of action 810 (e.g., a video frame) is processed by the model, the output 814 (e.g., predicted object bounding boxes) may be compared to ground truth annotations to evaluate the model's performance. If the output 814 is not sufficiently accurate, this performance feedback may be used by the model training host 802 to further train the model using the disclosed adaptive sampling, weighting, and/or object detection techniques, aiming to improve its object detection accuracy. The updated model may then be deployed to the model inference host 804.

In certain aspects, the model training host 802 may be deployed at or with the same or a different entity than that in which the model inference host 804 is deployed. For example, in order to offload model training processing, which can impact the performance of the model inference host 804, the model training host 802 may be deployed at a model server as further described herein. Further, in some cases, training and/or inference may be distributed amongst devices in a decentralized or federated fashion.

Figure 9:
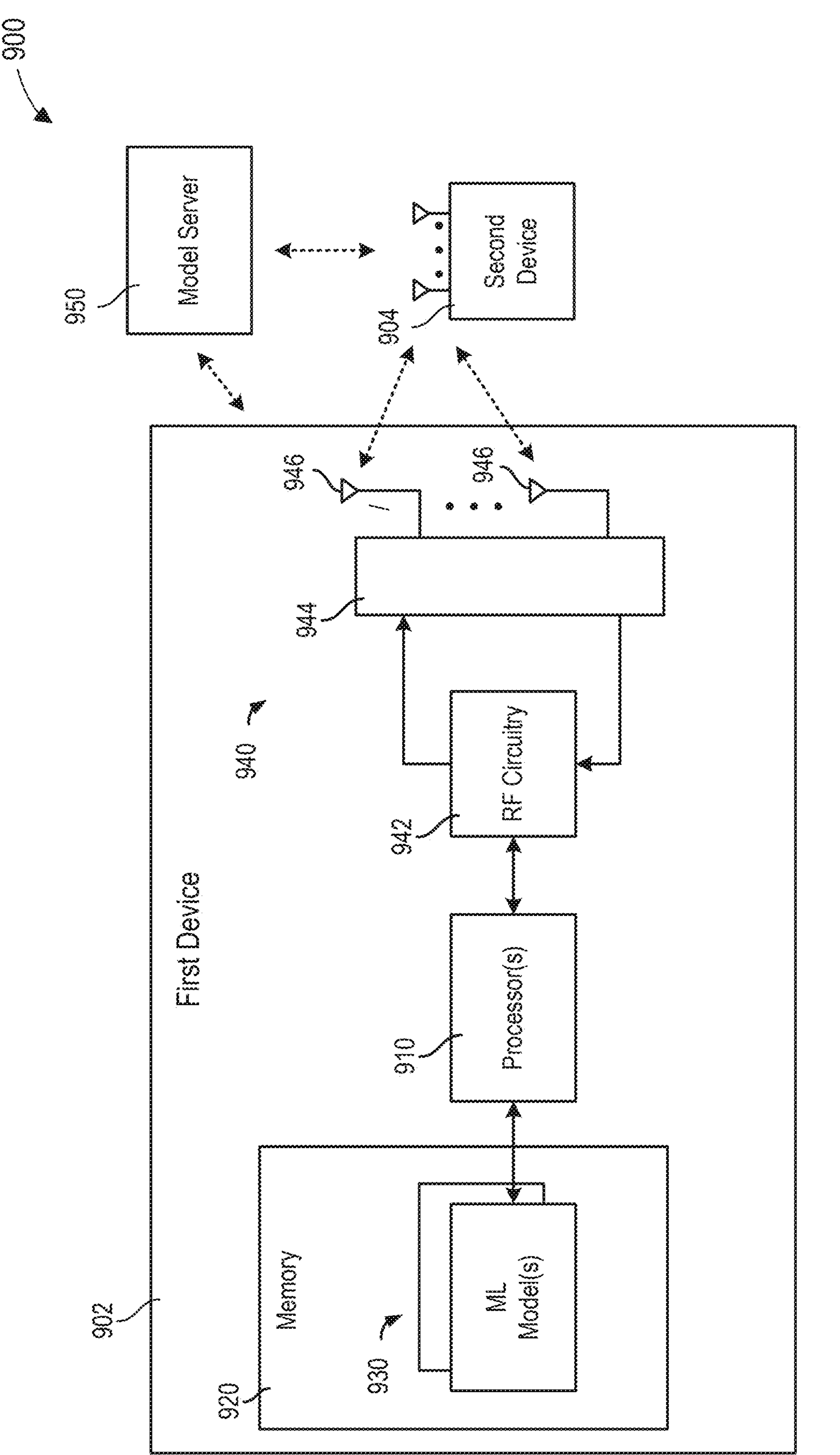
FIG. 9 depicts an example AI architecture of a first device that is in communication with a second device.

FIG. 9 illustrates an example AI architecture 900 of a first computing device 902 that is in communication with a second computing device 904. The first computing device 902 may be a server or cloud computing platform as described herein with respect to FIG. 8. Similarly, the second computing device 904 may be an embedded system or mobile device as described herein with respect to FIG. 8. Note that the AI architecture 900 of the first computing device 902 may be applied to the second computing device 904.

The first computing device 902 may be, or may include, a chip, system on chip (SoC), a system in package (SiP), chipset, package or device that includes one or more processors, processing blocks or processing elements (collectively "the processor 910") and one or more memory blocks or elements (collectively "the memory 920").

When receiving input data via the connected devices 946 (e.g., from the second computing device 904), the transceiver interface circuitry 942 and 944 may convert the received signals to a baseband frequency and then to digital signals for processing by the processor 910. The processor 910 may format the digital input signals and feed them into the adaptive sampling-based object detection model for inference.

One or more ML models 930 may be stored in the memory 920 and accessible to the processor(s) 910. In certain cases, different ML models 930 with different characteristics may be stored in the memory 920, and a particular ML model 930 may be selected based on its characteristics and/or application as well as characteristics and/or conditions of first wireless device 902 (e.g., a power state, a mobility state, a battery reserve, a temperature, etc.). For example, the ML models 930 may have different inference data and output pairings (e.g., different types of inference data produce different types of output), different levels of accuracies (e.g., 80%, 90%, or 95% accurate) associated with the predictions (e.g., the output 814 of FIG. 8), different latencies (e.g., processing times of less than 10 ms, 100 ms, or 1 second) associated with producing the predictions, different ML model sizes (e.g., file sizes), different coefficients or weights, etc.

The processor 910 may use an ML model 930 to produce output data (e.g., the output 814 of FIG. 8) based on input data (e.g., the inference data 812 of FIG. 8), for example, as described herein with respect to the model inference host 804 of FIG. 8. The ML model 930 may be used to perform any of various AI-enhanced tasks, such as those listed above.

In certain aspects, a model server 950 may perform any of various ML model lifecycle management (LCM) tasks for the first computing device 902 and/or the second computing device 904. The model server 950 may operate as the model training host and update the ML model 930 using training data. In some cases, the model server 950 may operate as the data source 806, in FIG. 8, to collect and host training data, inference data, and/or performance feedback associated with an ML model 930. In certain aspects, the model server 950 may host various types and/or versions of the ML models 930 for the first computing device 902 and/or the second computing device 904 to download.

In some cases, the model server 950 may monitor and evaluate the performance of the ML model 930 that utilizes adaptive sampling, weighting, and/or object detection to trigger one or more lifecycle management (LCM) tasks. For example, the model server 950 may determine whether to activate or deactivate the use of a particular adaptive sampling-based model at the first computing device 902 and/or the second computing device 904, based on factors such as the accuracy requirements, computational budget, and energy constraints of each device. The model server 950 may then provide instructions to the respective devices to manage their model usage accordingly. In some cases, the model server 950 may determine whether to switch to a different variant of the adaptive sampling-enhanced ML model 930 at the first computing device 902 and/or the second computing device 904, based on changes in the operating conditions or performance objectives. For instance, the model server 950 may instruct a device to switch from a complex model with high accuracy to a simpler model with lower latency when the battery level falls below a threshold. In yet further examples, the model server 950 may act as a central coordinator for collaborative learning of adaptive sampling-based models across multiple devices, using techniques such as federated learning to train a global model from locally-computed updates while preserving data privacy.

Example Artificial Intelligence Model

Figure 10:
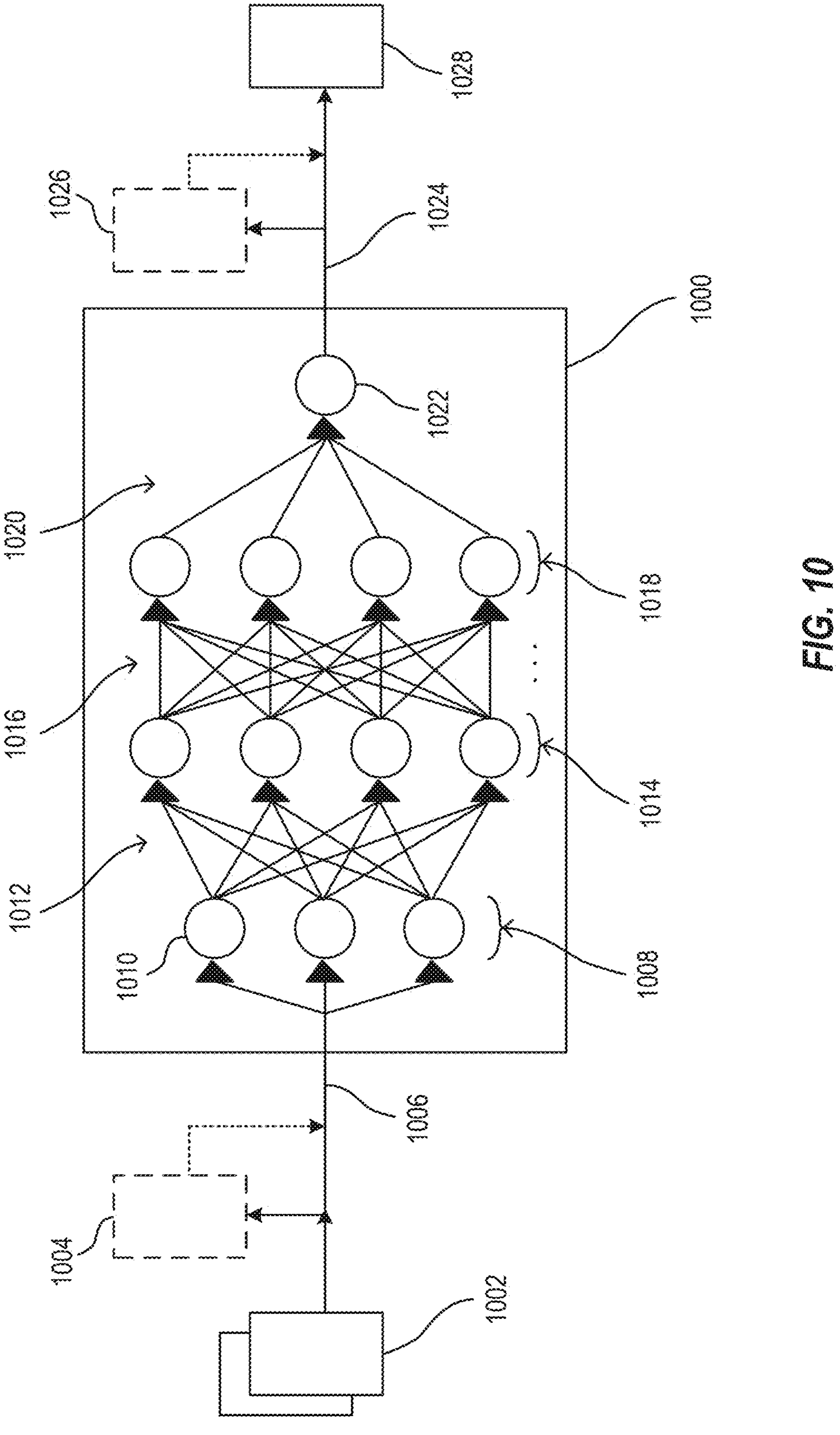
FIG. 10 depicts an example artificial neural network.

FIG. 10 is an illustrative block diagram of an example artificial neural network (ANN) 1000.

ANN 1000 may receive input data 1006 which may include one or more bits of data 1002, pre-processed data output from pre-processor 1004 (optional), or some combination thereof. Here, data 1002 may include training data, verification data, application-related data, or the like, e.g., depending on the stage of development and/or deployment of ANN 1000. Pre-processor 1004 may be included within ANN 1000 in some other implementations. Pre-processor 1004 may, for example, process all or a portion of data 1002 which may result in some of data 1002 being changed, replaced, deleted, etc. In some implementations, pre-processor 1004 may add additional data to data 1002.

ANN 1000 includes at least one first layer 1008 of artificial neurons 1010 (e.g., perceptrons) to process input data 1006 and provide resulting first layer output data via edges 1012 to at least a portion of at least one second layer 1014. Second layer 1014 processes data received via edges 1012 and provides second layer output data via edges 1016 to at least a portion of at least one third layer 1018. Third layer 1018 processes data received via edges 1016 and provides third layer output data via edges 1020 to at least a portion of a final layer 722 including one or more neurons to provide output data 1024. All or part of output data 1024 may be further processed in some manner by (optional) post-processor 1026. Thus, in certain examples, ANN 1000 may provide output data 1028 that is based on output data 1024, post-processed data output from post-processor 1026, or some combination thereof. Post-processor 1026 may be included within ANN 1000 in some other implementations. Post-processor 1026 may, for example, process all or a portion of output data 1024 which may result in output data 1028 being different, at least in part, to output data 1024, e.g., as result of data being changed, replaced, deleted, etc. In some implementations, post-processor 1026 may be configured to add additional data to output data 1024. In this example, second layer 1014 and third layer 1018 represent intermediate or hidden layers that may be arranged in a hierarchical or other like structure. Although not explicitly shown, there may be one or more further intermediate layers between the second layer 1014 and the third layer 1018.

The structure and training of artificial neurons 1010 in the various layers may be tailored to specific requirements of an application. Within a given layer of an ANN, some or all of the neurons may be configured to process information provided to the layer and output corresponding transformed information from the layer. For example, transformed information from a layer may represent a weighted sum of the input information associated with or otherwise based on a non-linear activation function or other activation function used to "activate" artificial neurons of a next layer. Artificial neurons in such a layer may be activated by or be responsive to weights and biases that may be adjusted during a training process. Weights of the various artificial neurons may act as parameters to control a strength of connections between layers or artificial neurons, while biases may act as parameters to control a direction of connections between the layers or artificial neurons. An activation function may select or determine whether an artificial neuron transmits its output to the next layer or not in response to its received data. Different activation functions may be used to model different types of non-linear relationships. By introducing non-linearity into an ML model, an activation function allows the ML model to "learn" complex patterns and relationships in the input data (e.g., inference data 812 in FIG. 8). Some non-exhaustive example activation functions include a linear function, binary step function, sigmoid, hyperbolic tangent (tanh), a rectified linear unit (ReLU) and variants, exponential linear unit (ELU), Swish, Softmax, and others.

Design tools (such as computer applications, programs, etc.) may be used to select appropriate structures for ANN 1000, a number of layers, and/or a number of artificial neurons in each layer, as well as selecting activation functions, a loss function, training processes, etc. Once an initial model has been designed, training of the model may be conducted using training data. Training data may include one or more datasets within which ANN 1000 may detect, determine, identify, and/or ascertain patterns. Training data may represent various types of information, including written, visual, audio, environmental context, operational properties, and/or the like. During training, parameters of artificial neurons 1010 may be changed, such as to minimize or otherwise reduce a loss function or a cost function. A training process may be repeated multiple times to fine-tune ANN 1000 with each iteration.

Various ANN model structures are available for consideration. For example, in a feedforward ANN structure each artificial neuron 1010 in a layer receives information from the previous layer and likewise produces information for the next layer. In a convolutional ANN structure, some layers may be organized into filters that extract features from data (e.g., training data and/or input data). In a recurrent ANN structure, some layers may have connections that allow for processing of data across time, such as for processing information having a temporal structure, such as time series data forecasting.

In an autoencoder ANN structure, compact representations of data may be processed and the model trained to predict or potentially reconstruct original data from a reduced set of features. An autoencoder ANN structure may be useful for tasks related to dimensionality reduction and data compression.

A generative adversarial ANN structure may include a generator ANN and a discriminator ANN that are trained to compete with each other. Generative-adversarial networks (GANs) are ANN structures that may be useful for tasks relating to generating synthetic data or improving the performance of other models. In the context of adaptive sampling and object detection, a GAN can be used to generate realistic video sequences with annotated object bounding boxes, which can then be used to train the adaptive sampling-based object detection model.

A transformer ANN structure makes use of attention mechanisms that may enable the model to process input sequences in a parallel and efficient manner. An attention mechanism allows the model to focus on different parts of the input sequence at different times. Attention mechanisms may be implemented using a series of layers known as attention layers to compute, calculate, determine or select weighted sums of input features based on a similarity between different elements of the input sequence. A transformer ANN structure may include a series of feedforward ANN layers that may learn non-linear relationships between the input and output sequences. The output of a transformer ANN structure may be obtained by applying a linear transformation to the output of a final attention layer. A transformer ANN structure may be of particular use for tasks that involve sequence modeling, or other like processing. In the context of adaptive sampling and object detection, a transformer can be used to model the temporal dependencies between frames and learn to attend to the most informative regions for accurate object tracking.

Another example type of ANN structure, is a model with one or more invertible layers. Models of this type may be inverted or "unwrapped" to reveal the input data that was used to generate the output of a layer.

Other example types of ANN model structures include fully connected neural networks (FCNNs) and long short-term memory (LSTM) networks.

ANN 1000 and/or other ML models may be implemented in various types of processing circuits along with memory and applicable instructions therein, for example, as described herein with respect to FIGS. 8 and 9. For example, general-purpose hardware circuits, such as, such as one or more central processing units (CPUs) and one or more graphics processing units (GPUs) may be employed to implement a model. One or more ML accelerators, such as tensor processing units (TPUs), embedded neural processing units (eNPUs), or other special-purpose processors, and/or field-programmable gate arrays (FPGAs), application-specific integrated circuits (ASICs), or the like also may be employed. Various programming tools may be available for developing ANNs and/or other ML models.

Example Method for Extrinsic Parameter Prediction

Figure 11:
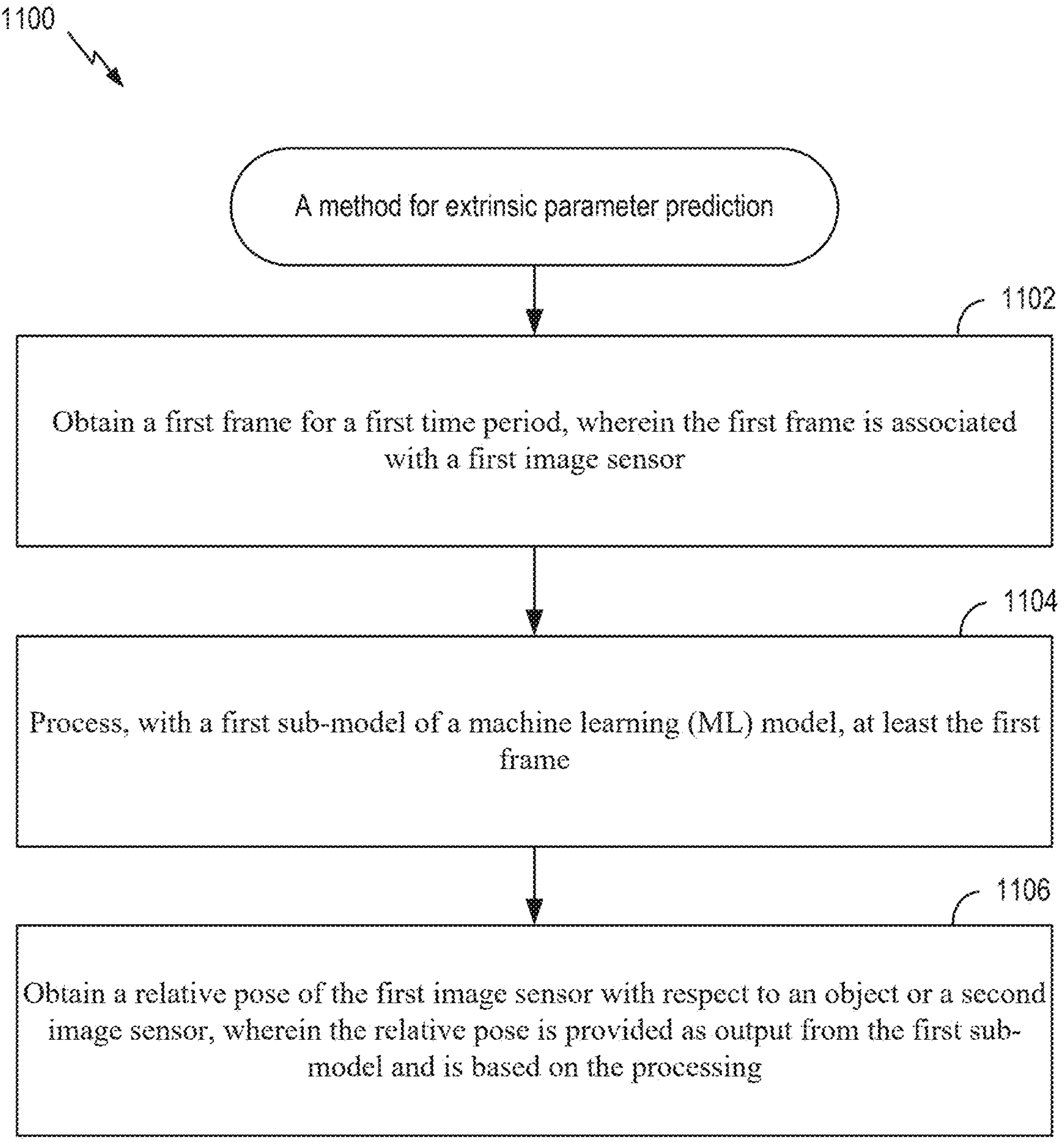
FIG. 11 depicts an example method for image sensor extrinsic parameters prediction.

FIG. 11 depicts an example method 1100 for extrinsic parameter prediction, such as for a first image sensor (e.g., a first camera). In certain aspects, method 1100, or any aspect related to it, may be performed by an apparatus, such as apparatus 1500 of FIG. 15, which includes various components operable, configured, or adapted to perform the method 1100.

Method 1100 begins, at block 1102, with obtaining a first frame for a first time period, wherein the first frame is associated with a first image sensor.

Method 1100 proceeds, at block 1104, with processing, with a first sub-model of a machine learning (ML) model, at least the first frame.

Method 1100 proceeds, at block 1106, with obtaining a relative pose of the first image sensor with respect to an object or a second image sensor, wherein the relative pose of the first image sensor is provided as output from the first sub-model and is based on the processing.

In certain aspects, method 1100 further includes: obtaining a second frame for the first time period, wherein the second frame is associated with the second image sensor, wherein: processing at least the first frame comprises processing, with the first sub-model of the ML model, the first frame and the second frame; and obtaining the relative pose comprises obtaining the relative pose of the first image sensor with respect to the second image sensor.

In certain aspects, the ML model is trained to perform first frame prediction based on a first loss function, and the first loss function is configured to adjust a first loss based on a first error between a first input frame for a second time period associated with the first image sensor and a first output frame for the second time period predicted by the ML model.

In certain aspects, the first error between the first input frame and the first output frame is predicted by the ML model based on: a first estimated relative pose between the first image sensor and the second image sensor, based on the first input frame and a second input frame, for the second time period, associated with the second image sensor; a first estimated depth for the first input frame; and a first estimated motion of the second image sensor between the second input frame, for the second time period, associated with the second image sensor and a third input frame, for a third time period, associated with the second image sensor.

In certain aspects, the first sub-model of the ML model has been trained to determine the first estimated relative pose; a second sub-model of the ML model has been trained to determine the first estimated depth; and a third sub-model of the ML model has been trained to determine the first estimated motion.

In certain aspects, the first output frame predicted by the ML model is further based on: a second estimated relative pose between the first image sensor and the second image sensor based on the third input frame and a fourth input frame, for the third time period, associated with the first image sensor.

In certain aspects, the first output frame predicted by the ML model is further based on: a second estimated motion of the first image sensor between the first input frame and a fourth input frame, for the third time period, associated with the first image sensor.

In certain aspects, the first error between the first input frame and the first output frame is predicted by the ML model based on: a first estimated relative pose between the first image sensor and a scene, based on the first input frame, wherein the first input frame is associated with the scene; a first estimated depth for the first input frame; and a first estimated motion of the second image sensor between the second input frame, for the second time period, associated with the second image sensor and a third input frame, for a third time period, associated with the second image sensor.

In certain aspects, the ML model is trained to perform second frame prediction based on a second loss function, and the second loss function is configured to adjust a second loss based on a second error between the second input frame and a second output frame for the second time period predicted by the ML model.

In certain aspects, the second error between the second input frame and the second output frame is predicted by the ML model based on: a second estimated relative pose between the second image sensor and the scene, based on the second input frame, wherein the second input frame is associated with the scene; a second estimated depth for the second input frame; and a second estimated motion of the first image sensor between the first input frame and a fourth input frame, for the third time period, associated with the first image sensor.

In certain aspects, the first image sensor is associated with the object, and obtaining the relative pose comprises obtaining the relative pose of the first image sensor with respect to the object.

In certain aspects, the ML model is trained to perform first frame prediction based on a first loss function, and the first loss function is configured to adjust first loss based on an error between a first input frame, for a second time period, associated with the first image sensor and a first output frame for the second time period predicted by the ML model.

In certain aspects, the error between the first input frame and the first output frame is predicted by the ML model based on: an estimated relative pose between the first image sensor and the object based on a second input frame, for a third time period, associated with the first image sensor; an estimated depth for the second input frame; and an estimated motion of the object from the second time period to the third time period.

In certain aspects, the first sub-model of the ML model is trained to determine the estimated relative pose; and a second sub-model of the ML model is trained to determine the estimated depth.

In certain aspects, the estimated motion of the object is obtained via one or more sensors associated with the object.

In certain aspects, the object comprises a moving object.

In certain aspects, the first frame comprises a raw image.

In certain aspects, method 1100 further includes warping the first frame prior to processing, with the first sub-model of the ML model, at least the first frame.

In certain aspects, method 1100 further includes removing one or more dynamic objects from the first frame, excluding the object if the object comprises a moving object, prior to processing, with the first sub-model of the ML model, at least the first frame.

In certain aspects, method 1100 further includes obtaining multiple relative poses of the first image sensor with respect to the object or the second image sensor, wherein: the multiple relative poses of the first image sensor are provided as multiple output from the first sub-model, and the multiple relative poses comprise the relative pose of the first image sensor; and determining a final relative pose of the first image sensor based on the multiple relative poses.

Note that FIG. 11 is just one example of a method, and other methods including fewer, additional, or alternative steps are possible consistent with this disclosure.

Example Methods for Training ML Models

FIG. 12 depicts an example method 1200 for training an ML model. In certain aspects, training the ML model comprises training at least a sub-model of the ML model to predict extrinsic parameters for one or more image sensors. For example, in certain aspects, training the ML model may involve training at least the sub-model of the ML model to predict a relative poses between at least a first image sensor (e.g., first camera) and a second image sensor (e.g., second camera).

Figure 15:
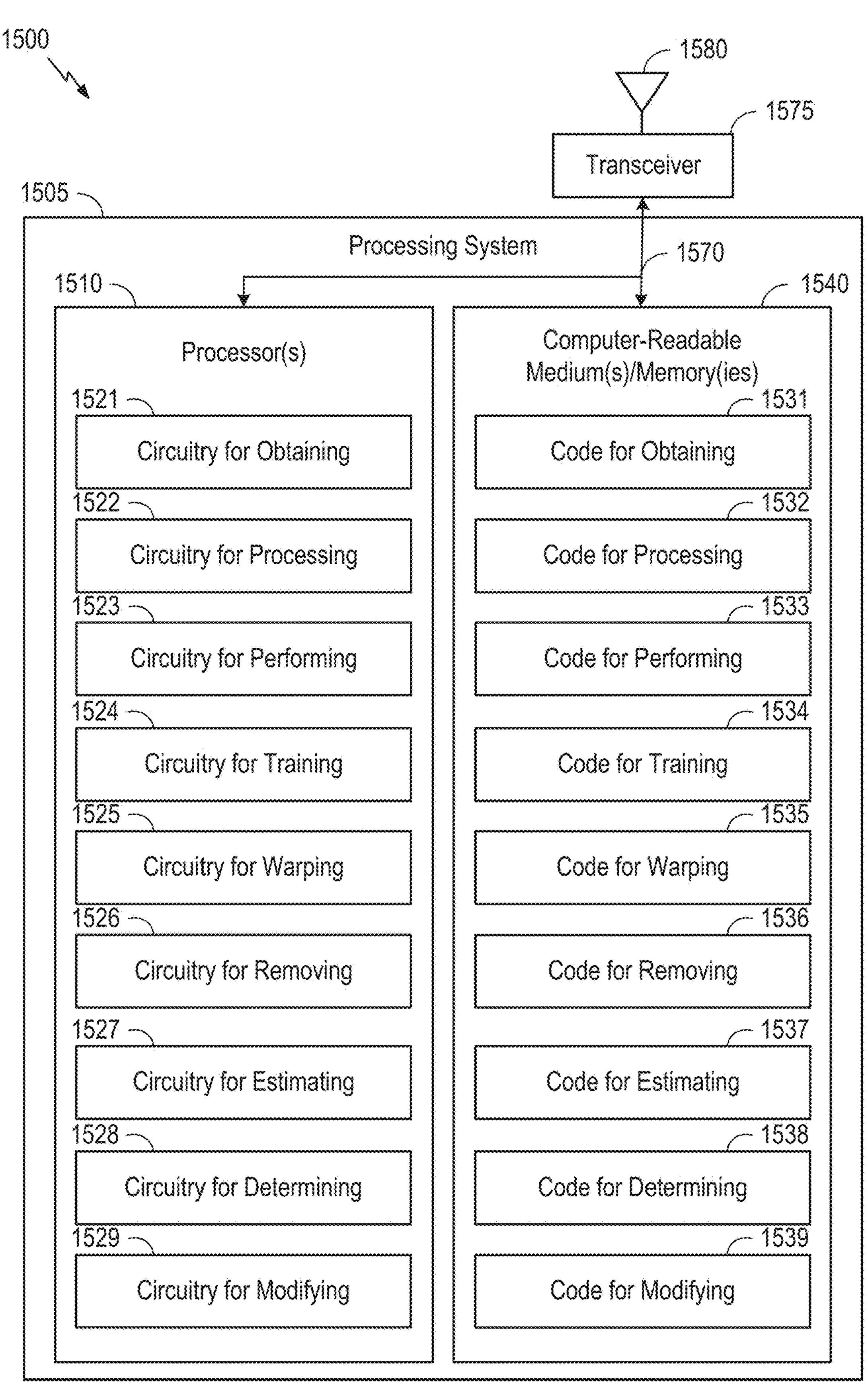
FIG. 15 depicts aspects of an example apparatus.

In certain aspects, method 1200, or any aspect related to it, may be performed by an apparatus, such as apparatus 1500 of FIG. 15, which includes various components operable, configured, or adapted to perform the method 1200.

Method 1200 begins, at block 1202, with initializing the ML model with a first set of parameters.

Method 1200 proceeds, at block 1204, with obtaining a plurality of training data instances, wherein each training data instance comprises at least: a respective first frame for a respective first time period, wherein the respective first frame is associated with a respective first image sensor; a respective second frame for a respective second time period, wherein the respective second frame is associated with a respective second image sensor; a respective third frame for the respective first time period, wherein the respective third frame is associated with the respective second image sensor.

Method 1200 proceeds, at block 1206, with training the ML model. Training the ML model comprises, for each training data instance of the plurality of training data instances, performing method 1200 at blocks 1208-1218.

For example, method 1200 proceeds, at block 1208, with estimating depth for the respective first frame.

Method 1200 proceeds, at block 1210, with estimating motion of the respective second image sensor from the respective first time period to the respective second time period based on the respective second frame and the respective third frame.

Method 1200 proceeds, at block 1212, with estimating a relative pose between the respective first image sensor and the respective second image sensor based on the respective first frame and the respective third frame.

Method 1200 proceeds, at block 1214, with processing, by the ML model, the respective first frame, the depth, the motion, and the relative pose to generate a fourth frame.

Method 1200 proceeds, at block 1216, with determining a loss value based on a loss function. In certain aspects, the loss function is configured to adjust a loss value based on an error between the respective first frame and the fourth frame.

Method 1200 proceeds, at block 1218, with modifying one or more parameters of the ML model based on the loss value.

Note that FIG. 12 is just one example of a method, and other methods including fewer, additional, or alternative steps are possible consistent with this disclosure.

FIG. 13 depicts another example method 1300 for training an ML model. In certain aspects, training the ML model comprises training at least a sub-model of the ML model to predict extrinsic parameters for an image sensor. For example, in certain aspects, training the ML model may involve training at least the sub-model of the ML model to predict a relative pose of a first image sensor (e.g., first camera) with respect to a moving object (e.g., a relative pose of the first camera with respect to a vehicle that the first camera is mounted on).

In certain aspects, method 1300, or any aspect related to it, may be performed by an apparatus, such as apparatus 1500 of FIG. 15, which includes various components operable, configured, or adapted to perform the method 1300.

Method 1300 begins, at block 1302, with initializing the ML model with a first set of parameters.

Method 1300 proceeds, at block 1304, with obtaining a plurality of training data instances, wherein each training data instance comprises at least: a respective first frame for a respective first time period, wherein the respective first frame is associated with a respective first image sensor, and wherein the respective first image sensor is associated with a respective moving object; and a respective second frame for a respective second time period, wherein the respective second frame is associated with the respective first image sensor.

Method 1300 proceeds, at block 1306, with training the ML model. Training the ML model comprises, for each training data instance of the plurality of training data instances, performing method 1300 at blocks 1308-1318.

For example, method 1300 proceeds, at block 1308, with estimating depth for the respective second frame.

Method 1300 proceeds, at block 1310, with estimating a relative pose between the respective first image sensor and the respective moving object based on the respective second frame.

Method 1300 proceeds, at block 1312, with determining motion of the respective moving object from the respective first time period to the respective second time period.

Method 1300 proceeds, at block 1314, with processing, by the ML model, the respective second frame, the depth, the relative pose, and the motion to generate a third frame.

Method 1300 proceeds, at block 1316, with determining a loss value based on a loss function. In certain aspects, the loss function is configured to adjust a loss value based on an error between the respective first frame and the third frame.

Method 1300 proceeds, at block 1318, with modifying one or more parameters of the ML model based on the loss value.

Note that FIG. 13 is just one example of a method, and other methods including fewer, additional, or alternative steps are possible consistent with this disclosure.

Example Sensor and Computing System

Figure 14:
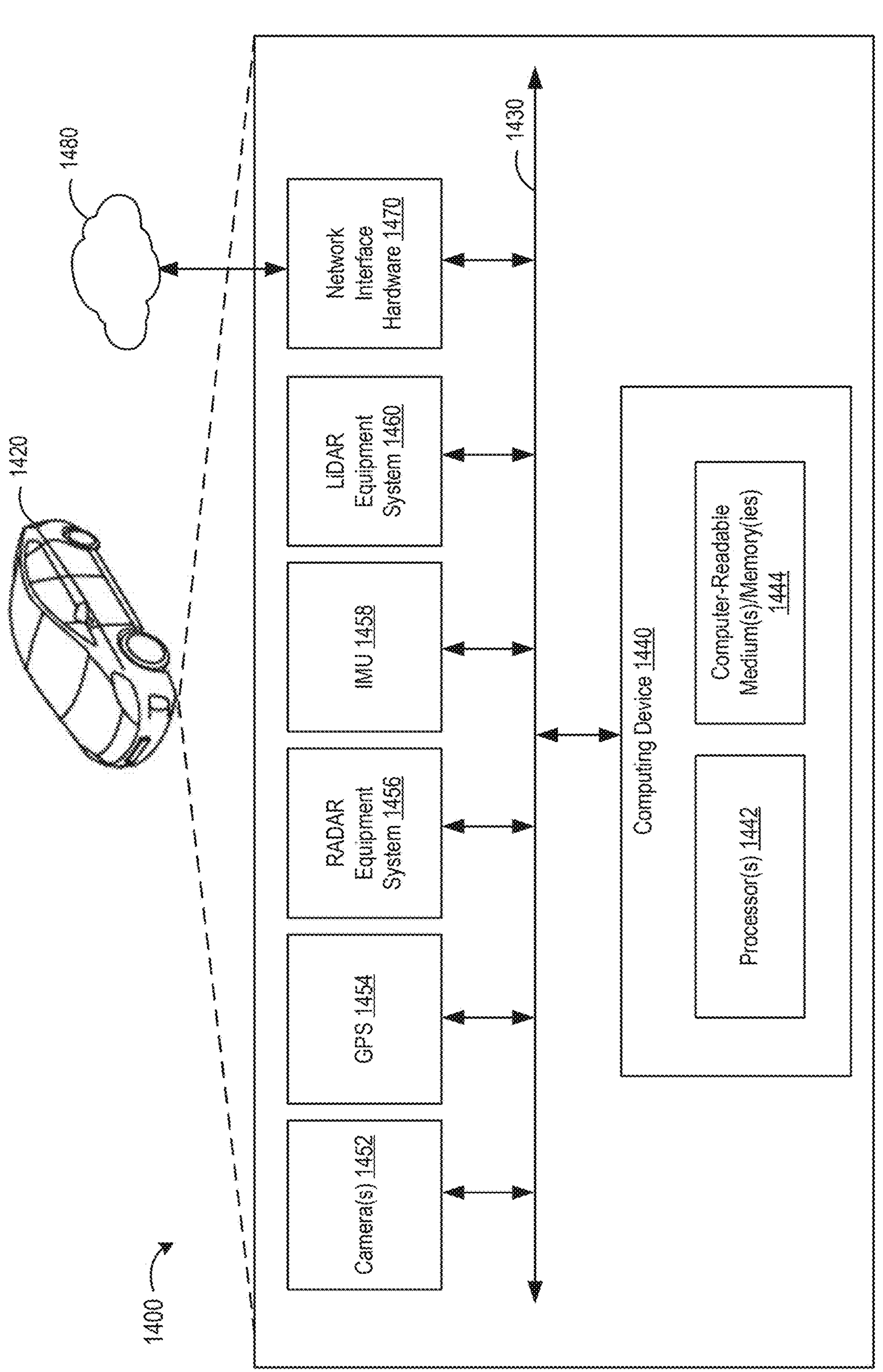
FIG. 14 depicts an example sensor and computing system.

FIG. 14 depicts an example sensor and computing system 1400 equipped, for example, in a vehicle 1420 or other apparatus, such as a robot. The vehicle 1420 depicted in FIG. 14 is depicted by way of an example schematic of a vehicle including sensor resources and a computing device. Not every vehicle may be required to be equipped with the same set of sensor resources, nor may every vehicle be required to be configured with the same set of systems for perceiving attributes of an environment. FIG. 14 only provides one example configuration of sensor resources and systems equipped within a vehicle 1420. It is understood that aspects described herein are made with reference to implementation with, on, or in a vehicle 1420. However, this is merely an example. The vehicle 1420 may be any other apparatus.

In particular, FIG. 14 provides an example schematic of the vehicle 1420 including a variety of sensor resources, which may be utilized, by the vehicle 1420 to perceive and collect sensor data about the environment. For example, the vehicle 1420 may include a computing device 1440 comprising one or more processors 1442 and one or more non-transitory computer readable medium(s)/memory(ies) 1444, one or more cameras 1452, a global positioning system (GPS) 1454, a RADAR equipment system 1456, an inertial measurement unit (IMU) 1458, a LiDAR equipment system 1460, and network interface hardware 1470.

In certain aspects, the vehicle 1420 may not include all of the components depicted in FIG. 14. In certain aspects, the vehicle 1420 may include one or more of the components, such as the one or more cameras 1452, the GPS 1454, the RADAR equipment system 1456, the IMU 1458, the LiDAR equipment system 1460, a SONAR system, and/or the like. These and other components of the vehicle 1420 may be communicatively connected to each other via a communication path 1430.

The communication path 1430 may be formed from any medium that is capable of transmitting a signal such as, for example, conductive wires, conductive traces, optical waveguides, or the like. The communication path 1430 may also refer to the expanse in which electromagnetic radiation and their corresponding electromagnetic waves traverses. Moreover, the communication path 1430 may be formed from a combination of mediums capable of transmitting signals. In one embodiment, the communication path 1430 comprises a combination of conductive traces, conductive wires, connectors, and buses that cooperate to permit the transmission of electrical data signals to components such as processors, memories, sensors, input devices, output devices, and communication devices. Accordingly, the communication path 1430 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. As used herein, the term "communicatively coupled" means that coupled components are capable of exchanging signals with one another such as, for example, electrical signals via conductive medium, electromagnetic signals via air, optical signals via optical waveguides, and the like.

The computing device 1440 may be any device or combination of components comprising one or more processors 1442 and one or more non-transitory computer readable medium(s)/memory(ies) 1444. The one or more processors 1442 may be any device(s) capable of executing the processor-executable instructions stored in the one or more non-transitory computer readable medium(s)/memory(ies) 1444. For example, each of the one or more processors 1442 may be an electric controller, an integrated circuit, a microchip, a computer, or any other computing device. The one or more processors 1442 are communicatively coupled to the other components of the vehicle 1420 by the communication path 1430. Accordingly, the communication path 1430 may communicatively couple any number of processors 1442 with one another, and allow the components coupled to the communication path 1430 to operate in a distributed computing environment. Specifically, each of the components may operate as a node that may send and/or receive data.

The one or more non-transitory computer readable medium(s)/memory(ies) 1444 may comprise RAM, ROM, flash memories, hard drives, or any non-transitory memory device capable of storing processor-executable instructions such that the processor-executable instructions can be accessed and executed by the one or more processors 1442. The machine-readable instruction set may comprise logic or algorithm(s) written in any programming language of any generation (e.g., 1GL, 2GL, 3GL, 4GL, or 5GL, where GL stands for "generation language") such as, for example, machine language that may be directly executed by the one or more processors 1442, or assembly language, object-oriented programming (OOP), scripting languages, microcode, etc., that may be compiled or assembled into processor-executable instructions and stored in the one or more memories 1444. Alternatively, the processor-executable instructions may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

The vehicle 1420 may further include one or more cameras 1452. The one or more cameras 1452 may be any device having an array of sensing devices (e.g., a charge-coupled device (CCD) array or active pixel sensors) capable of detecting radiation in an ultraviolet wavelength band, a visible light wavelength band, or an infrared wavelength band. The one or more cameras 1452 may have any resolution. The one or more cameras 1452 may be an omni-direction camera and/or a panoramic camera. In certain aspects, one or more optical components, such as a mirror, fish-eye lens, and/or any other type of lens may be optically coupled to the one or more cameras 1452. The image data collected by the one or more cameras 1452 may be stored in the one or more non-transitory computer readable medium(s)/memory(ies) 1444.

GPS 1454, may be coupled to the communication path 1430 and communicatively coupled to the computing device 1440 of the vehicle 1420. The GPS 1454 is capable of generating location information indicative of a location of the vehicle 1420 by receiving one or more GPS signals from one or more GPS satellites. The GPS signal communicated to the computing device 1440 via the communication path 1430 may include location information including a message, a latitude and longitude data set, a street address, a name of a known location based on a location database, and/or the like. Additionally, the GPS 1454 may be interchangeable with any other system capable of generating an output indicative of a location. For example, a local positioning system that provides a location based on cellular signals and broadcast towers or a wireless signal detection device capable of triangulating a location by way of wireless signals received from one or more wireless signal antennas. The sensor data collected by the GPS 1454 may be stored in the one or more non-transitory computer readable medium(s)/memory(ies) 1444.

RADAR equipment system 1456 measures the distance to objects over wide distances. It is also possible to measure the relative speed of the detected object. The RADAR equipment system 1456 may be a continuous wave (CW), frequency-modulated continuous wave (FMCW), 3D-radio detection and ranging equipment (3D FMCW multiple-input and multiple-output (MIMO)), or 4D-radio detection and ranging equipment (4D FMCW MIMO). The sensor data collected by the RADAR equipment system 1456 may be stored in the one or more non-transitory computer readable medium(s)/memory(ies) 1444.

IMU 1458 is an electronic device that measures and reports vehicle 1420's specific force, angular rate, and/or the orientation of the vehicle 1420, using a combination of accelerometers, gyroscopes, and/or magnetometers. The sensor data collected by the IMU 1458 may be stored in one or more non-transitory computer readable medium(s)/memory(ies) 1444.

LiDAR equipment system 1460 is communicatively coupled to the communication path 1430 and the computing device 1440. LiDAR equipment system 1460 may be a system and method of using pulsed laser light to measure distances from the LiDAR equipment system 1460 to objects that reflect the pulsed laser light. A LiDAR equipment system 1460 may be made as solid-state devices with few or no moving parts, including those configured as optical phased array devices where its prism-like operation permits a wide field-of-view without the weight and size complexities associated with a traditional rotating light detection and ranging equipment system 1460. LiDAR equipment system 1460 may be particularly suited to measuring time-of-flight, which in turn may be correlated to distance measurements with object(s) that are within a field-of-view of the LiDAR equipment system 1460. By calculating the difference in return time of the various wavelengths of the pulsed laser light emitted by the LiDAR equipment system 1460, a digital 3D representation of an object and/or or environment may be generated. The pulsed laser light emitted by the LiDAR equipment system 1460 may include emissions operated in and/or near the infrared range of the electromagnetic spectrum, for example, having emitted radiation of about 905 nanometers. Vehicle 1420 may use LiDAR equipment system 1460 to provide detailed 3D spatial information for the identification of object(s) near the vehicle 1420, as well as the use of such information in the service of systems for vehicular mapping, navigation and autonomous operations. In certain aspects, period cloud data collected by the LiDAR equipment system 1460 may be stored in the one or more non-transitory computer readable medium(s)/memory(ies) 1444.

In certain aspects, vehicle 1420 may be equipped with a vehicle-to-vehicle (V2V) communication system, which may rely on network interface hardware 1470. The network interface hardware 1470 may be coupled to the communication path 1430 and communicatively coupled to the computing device 1440. The network interface hardware 1470 may be any device capable of transmitting and/or receiving data with a network 1480 and/or directly with another vehicle equipped with a V2V communication system. Accordingly, network interface hardware 1470 can include a communication transceiver for sending and/or receiving any wired and/or wireless communication. For example, the network interface hardware 1470 may include an antenna, a modem, a local area network (LAN) port, a Wi-Fi card, a worldwide interoperability for microwave access (WiMax) card, mobile communications hardware, near-field communication (NFC) hardware, satellite communication hardware, and/or any wired or wireless hardware for communicating with other networks and/or devices. In certain aspects, network interface hardware 1470 includes hardware configured to operate in accordance with the Bluetooth wireless communication protocol. In certain aspects, network interface hardware 1470 may include a Bluetooth send/receive module for sending and/or receiving Bluetooth communications to/from network 1480 and/or another vehicle or device.

Example Apparatus for Extrinsic Parameter Prediction

FIG. 15 depicts aspects of an example apparatus 1500. In certain aspects, apparatus 1500 is a computing device, such as computing device 1440 depicted and described with respect to FIG. 14 (e.g., which may or may not be implemented by a vehicle 1420).

The apparatus 1500 includes a processing system 1505, which may be coupled to a transceiver 1575 (e.g., a transmitter and/or a receiver). The transceiver 1575 is configured to transmit and receive signals for the apparatus 1500 via an antenna 1580, such as the various signals as described herein. The processing system 1505 may be configured to perform processing functions for the apparatus 1500, including processing signals received and/or to be transmitted by the apparatus 1500.

The processing system 1505 includes one or more processors 1510. Generally, processor(s) 1510 may be configured to execute computer-executable instructions (e.g., software code) to perform various functions, as described herein. The one or more processors 1510 are coupled to a computer-readable medium/memory 1540 via a bus 1570. In certain aspects, the computer-readable medium/memory 1540 is configured to store instructions (e.g., computer-executable code) that when executed by the one or more processors 1510, enable and cause the one or more processors 1510 to perform the method 1100 described with respect to FIG. 11, the method 1200 described with respect to FIG. 12, the method 1300 described with respect to FIG. 13, or any aspect related to method 1100, method 1200, and/or method 1300, including any operations described in relation to FIGS. 3-7. Note that reference to a processor performing a function of the apparatus 1500 may include one or more processors performing that function of the apparatus 1500, such as in a distributed fashion.

In the depicted example, computer-readable medium/memory 1540 stores code 1531 for obtaining, code 1532 for processing, code 1533 for performing, code 1534 for training, code 1535 for warping, code 1536 for removing, code 1537 for estimating, code 1538 for determining, and code 1539 for modifying. Processing of the code 1531-1539 may enable and cause the apparatus 1500 to perform the method 1100 described with respect to FIG. 11, the method 1200 described with respect to FIG. 12, the method 1300 described with respect to FIG. 13, or any aspect related to method 1100, method 1200, and/or method 1300, including any operations described in relation to FIGS. 3-7.

The one or more processors 1510 include circuitry configured to implement (e.g., execute) the code stored in the computer-readable medium/memory 1540, including circuitry 1521 for obtaining, circuitry 1522 for processing, circuitry 1523 for performing, circuitry 1524 for training, circuitry 1525 for warping, circuitry 1526 for removing, circuitry 1527 for estimating, circuitry 1528 for determining, and circuitry 1529 for modifying. Processing with circuitry 1521-1529 may enable and cause the apparatus 1500 to perform the method 1100 described with respect to FIG. 11, the method 1200 described with respect to FIG. 12, the method 1300 described with respect to FIG. 13, or any aspect related to method 1100, method 1200, and/or method 1300, including any operations described in relation to FIGS. 3-7.

Apparatus 1500 may be implemented in various ways. For example, apparatus 1500 may be implemented within on-site, remote, or cloud-based processing equipment.

Apparatus 1500 is just one example, and other configurations are possible. For example, in alternative aspects, aspects described with respect to apparatus 1500 may be omitted, added, or substituted for alternative aspects.

Example Clauses

Implementation examples are described in the following numbered clauses:

Clause 1: A method for relative pose estimation, comprising: obtaining a first frame for a first time period, wherein the first frame is associated with a first image sensor; processing, with a first sub-model of a machine learning (ML) model, at least the first frame; and obtaining a relative pose of the first image sensor with respect to an object or a second image sensor, wherein the relative pose of the first image sensor is provided as output from the first sub-model and is based on the processing.

Clause 2: The method of Clause 1, further comprising: obtaining a second frame for the first time period, wherein the second frame is associated with the second image sensor, wherein: processing at least the first frame comprises processing, with the first sub-model of the ML model, the first frame and the second frame; and obtaining the relative pose comprises obtaining the relative pose of the first image sensor with respect to the second image sensor.

Clause 3: The method of Clause 2, wherein: the ML model is trained to perform first frame prediction based on a first loss function, and the first loss function is configured to adjust a first loss based on a first error between a first input frame for a second time period associated with the first image sensor and a first output frame for the second time period predicted by the ML model.

Clause 4: The method of Clause 3, wherein the first error between the first input frame and the first output frame is predicted by the ML model based on: a first estimated relative pose between the first image sensor and the second image sensor, based on the first input frame and a second input frame, for the second time period, associated with the second image sensor; a first estimated depth for the first input frame; and a first estimated motion of the second image sensor between the second input frame, for the second time period, associated with the second image sensor and a third input frame, for a third time period, associated with the second image sensor.

Clause 5: The method of Clause 4, wherein: the first sub-model of the ML model has been trained to determine the first estimated relative pose; a second sub-model of the ML model has been trained to determine the first estimated depth; and a third sub-model of the ML model has been trained to determine the first estimated motion.

Clause 6: The method of any one of Clauses 4-5, wherein the first output frame predicted by the ML model is further based on: a second estimated relative pose between the first image sensor and the second image sensor based on the third input frame and a fourth input frame, for the third time period, associated with the first image sensor.

Clause 7: The method of any one of Clauses 4-6, wherein the first output frame predicted by the ML model is further based on: a second estimated motion of the first image sensor between the first input frame and a fourth input frame, for the third time period, associated with the first image sensor.

Clause 8: The method of any one of Clauses 3-7, wherein the first error between the first input frame and the first output frame is predicted by the ML model based on: a first estimated relative pose between the first image sensor and a scene, based on the first input frame, wherein the first input frame is associated with the scene; a first estimated depth for the first input frame; and a first estimated motion of the second image sensor between the second input frame, for the second time period, associated with the second image sensor and a third input frame, for a third time period, associated with the second image sensor.

Clause 9: The method of Clause 8, wherein: the ML model is trained to perform second frame prediction based on a second loss function, and the second loss function is configured to adjust a second loss based on a second error between the second input frame and a second output frame for the second time period predicted by the ML model.

Clause 10: The method of Clause 9, wherein the second error between the second input frame and the second output frame is predicted by the ML model based on: a second estimated relative pose between the second image sensor and the scene, based on the second input frame, wherein the second input frame is associated with the scene; a second estimated depth for the second input frame; and a second estimated motion of the first image sensor between the first input frame and a fourth input frame, for the third time period, associated with the first image sensor.

Clause 11: The method of any one of Clauses 1-10, wherein: the first image sensor is associated with the object, and obtaining the relative pose comprises obtaining the relative pose of the first image sensor with respect to the object.

Clause 12: The method of Clause 11, wherein: the ML model is trained to perform first frame prediction based on a first loss function, and the first loss function is configured to adjust first loss based on an error between a first input frame, for a second time period, associated with the first image sensor and a first output frame for the second time period predicted by the ML model.

Clause 13: The method of Clause 12, wherein the error between the first input frame and the first output frame is predicted by the ML model based on: an estimated relative pose between the first image sensor and the object based on a second input frame, for a third time period, associated with the first image sensor; an estimated depth for the second input frame; and an estimated motion of the object from the second time period to the third time period.

Clause 14: The method of Clause 13, wherein: the first sub-model of the ML model is trained to determine the estimated relative pose; and a second sub-model of the ML model is trained to determine the estimated depth.

Clause 15: The method of any one of Clauses 13-14, wherein the estimated motion of the object is obtained via one or more sensors associated with the object.

Clause 16: The method of any one of Clauses 11-15, wherein the object comprises a moving object.

Clause 17: The method of any one of Clauses 1-16, wherein the first frame comprises a raw image.

Clause 18: The method of any one of Clauses 1-17, further comprising: warping the first frame prior to processing, with the first sub-model of the ML model, at least the first frame.

Clause 19: The method of any one of Clauses 1-18, further comprising: removing one or more dynamic objects from the first frame, excluding the object if the object comprises a moving object, prior to processing, with the first sub-model of the ML model, at least the first frame.

Clause 20: The method of any one of Clauses 1-19, further comprising: obtaining multiple relative poses of the first image sensor with respect to the object or the second image sensor, wherein: the multiple relative poses of the first image sensor are provided as multiple output from the first sub-model, and the multiple relative poses comprise the relative pose of the first image sensor; and determining a final relative pose of the first image sensor based on the multiple relative poses.

Clause 21: A method of training a machine learning (ML) model comprising: initializing the ML model with a first set of parameters; obtaining a plurality of training data instances, wherein each training data instance comprises at least: a respective first frame for a respective first time period, wherein the respective first frame is associated with a respective first image sensor; a respective second frame for a respective second time period, wherein the respective second frame is associated with a respective second image sensor; and a respective third frame for the respective first time period, wherein the respective third frame is associated with the respective second image sensor; training the ML model comprising, for each training data instance of the plurality of training data instances: estimating depth for the respective first frame; estimating motion of the respective second image sensor from the respective first time period to the respective second time period based on the respective second frame and the respective third frame; estimating a relative pose between the respective first image sensor and the respective second image sensor based on the respective first frame and the respective third frame; processing, by the ML model, the respective first frame, the depth, the motion, and the relative pose to generate a respective fourth frame; determining a loss value based on a loss function configured to adjust a loss value based on an error between the respective first frame and the respective fourth frame; and modifying one or more parameters of the ML model based on the loss value.

Clause 22: A method of training a machine learning (ML) model comprising: initializing the ML model with a first set of parameters; obtaining a plurality of training data instances, wherein each training data instance comprises at least: a respective first frame for a respective first time period, wherein the respective first frame is associated with a respective first image sensor, and wherein the respective first image sensor is associated with a respective object; and a respective second frame for a respective second time period, wherein the respective second frame is associated with the respective first image sensor; training the ML model comprising, for each training data instance of the plurality of training data instances: estimating depth for the respective second frame; estimating a relative pose between the respective first image sensor and the respective object based on the respective second frame; determining motion of the respective object from the respective first time period to the respective second time period; processing, by the ML model, the respective second frame, the depth, the relative pose, and the motion to generate a respective third frame; determining a loss value based on a loss function, wherein the loss function is configured to adjust a loss value based on error between the respective first frame and the respective third frame; and modifying one or more parameters of the ML model based on the loss value.

Clause 23: One or more apparatuses, comprising: one or more memories comprising executable instructions; and one or more processors configured to execute the executable instructions and cause the one or more apparatuses to perform a method in accordance with any one of clauses 1-22.

Clause 24: One or more apparatuses, comprising: one or more memories; and one or more processors, coupled to the one or more memories, configured to cause the one or more apparatuses to perform a method in accordance with any one of Clauses 1-22.

Clause 25: One or more apparatuses, comprising: one or more memories; and one or more processors, coupled to the one or more memories, configured to perform a method in accordance with any one of Clauses 1-22.

Clause 26: One or more apparatuses, comprising means for performing a method in accordance with any one of Clauses 1-22.

Clause 27: One or more non-transitory computer-readable media comprising executable instructions that, when executed by one or more processors of one or more apparatuses, cause the one or more apparatuses to perform a method in accordance with any one of Clauses 1-22.

Clause 28: One or more computer program products embodied on one or more computer-readable storage media comprising code for performing a method in accordance with any one of Clauses 1-22.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, "coupled to" and "coupled with" generally encompass direct coupling and indirect coupling (e.g., including intermediary coupled aspects) unless stated otherwise. For example, stating that a processor is coupled to a memory allows for a direct coupling or a coupling via an intermediary aspect, such as a bus.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Reference to an element in the singular is not intended to mean only one unless specifically so stated, but rather "one or more." The subsequent use of a definite article (e.g., "the" or "said") with an element (e.g., "the processor") is not intended to invoke a singular meaning (e.g., "only one") on the element unless otherwise specifically stated. For example, reference to an element (e.g., "a processor," "a controller," "a memory," "a transceiver," "an antenna," "the processor," "the controller," "the memory," "the transceiver," "the antenna," etc.), unless otherwise specifically stated, should be understood to refer to one or more elements (e.g., "one or more processors," "one or more controllers," "one or more memories," "one more transceivers," etc.). The terms "set" and "group" are intended to include one or more elements, and may be used interchangeably with "one or more." Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions. Unless specifically stated otherwise, the term "some" refers to one or more. All structural and functional equivalents to the elements of the various aspects described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims.

What is claimed is:

1. A method for relative pose estimation, comprising:

obtaining a first frame for a first time period, wherein the first frame is associated with a first image sensor;

warping the first frame;

after warping the first frame, processing, with a first sub-model of a machine learning (ML) model, at least the first frame; and obtaining a relative pose of the first image sensor with respect to an object or a second image sensor, wherein the relative pose of the first image sensor is provided as output from the first sub-model and is based on the processing.

2. The method of claim 1, further comprising:

obtaining a second frame for the first time period, wherein the second frame is associated with the second image sensor, wherein:

processing at least the first frame comprises processing, with the first sub-model of the ML model, the first frame and the second frame; and obtaining the relative pose comprises obtaining the relative pose of the first image sensor with respect to the second image sensor.

3. The method of claim 2, wherein:

the ML model is trained to perform first frame prediction based on a first loss function, and the first loss function is configured to adjust a first loss based on a first error between a first input frame for a second time period associated with the first image sensor and a first output frame for the second time period predicted by the ML model.

4. The method of claim 1, wherein:

the first image sensor is associated with the object, and obtaining the relative pose comprises obtaining the relative pose of the first image sensor with respect to the object.

5. The method of claim 4, wherein the object comprises a moving object.

6. The method of claim 4, wherein:

the ML model is trained to perform first frame prediction based on a first loss function, and the first loss function is configured to adjust first loss based on an error between a first input frame, for a second time period, associated with the first image sensor and a first output frame for the second time period predicted by the ML model.

7. The method of claim 6, wherein the error between the first input frame and the first output frame is predicted by the ML model based on:

an estimated relative pose between the first image sensor and the object based on a second input frame, for a third time period, associated with the first image sensor;

an estimated depth for the second input frame; and an estimated motion of the object from the second time period to the third time period.

8. The method of claim 7, wherein:

the first sub-model of the ML model is trained to determine the estimated relative pose; and a second sub-model of the ML model is trained to determine the estimated depth.

9. The method of claim 7, wherein the estimated motion of the object is obtained via one or more sensors associated with the object.

10. The method of claim 1, wherein the first frame comprises a raw image.

11. The method of claim 1, further comprising:

removing one or more dynamic objects from the first frame, excluding the object if the object comprises a moving object, prior to processing, with the first sub-model of the ML model, at least the first frame.

12. The method of claim 1, further comprising:

obtaining multiple relative poses of the first image sensor with respect to the object or the second image sensor, wherein:

the multiple relative poses of the first image sensor are provided as multiple output from the first sub-model, and the multiple relative poses comprise the relative pose of the first image sensor; and determining a final relative pose of the first image sensor based on the multiple relative poses.

13. A method for relative pose estimation, comprising:

obtaining a first frame for a first time period, wherein the first frame is associated with a first image sensor;

obtaining a second frame for the first time period, wherein the second frame is associated with a second image sensor;

processing, with a first sub-model of a machine learning (ML) model, the first frame and the second frame, wherein:

the ML model is trained to perform first frame prediction based on a first loss function, and the first loss function is configured to adjust a first loss based on a first error between a first input frame for a second time period associated with the first image sensor and a first output frame for the second time period predicted by the ML model; and obtaining a relative pose of the first image sensor with respect to the second image sensor, wherein the relative pose of the first image sensor is provided as output from the first sub-model and is based on the processing.

14. The method of claim 13, wherein the first error between the first input frame and the first output frame is predicted by the ML model based on:

a first estimated relative pose between the first image sensor and the second image sensor, based on the first input frame and a second input frame, for the second time period, associated with the second image sensor;

a first estimated depth for the first input frame; and a first estimated motion of the second image sensor between the second input frame, for the second time period, associated with the second image sensor and a third input frame, for a third time period, associated with the second image sensor.

15. The method of claim 14, wherein:

the first sub-model of the ML model has been trained to determine the first estimated relative pose;

a second sub-model of the ML model has been trained to determine the first estimated depth; and a third sub-model of the ML model has been trained to determine the first estimated motion.

16. The method of claim 14, wherein the first output frame predicted by the ML model is further based on:

a second estimated relative pose between the first image sensor and the second image sensor based on the third input frame and a fourth input frame, for the third time period, associated with the first image sensor.

17. The method of claim 14, wherein the first output frame predicted by the ML model is further based on:

a second estimated motion of the first image sensor between the first input frame and a fourth input frame, for the third time period, associated with the first image sensor.

18. The method of claim 13, wherein the first error between the first input frame and the first output frame is predicted by the ML model based on:

a first estimated relative pose between the first image sensor and a scene, based on the first input frame, wherein the first input frame is associated with the scene;

a first estimated depth for the first input frame; and a first estimated motion of the second image sensor between a second input frame, for the second time period, associated with the second image sensor and a third input frame, for a third time period, associated with the second image sensor.

19. The method of claim 18, wherein:

the ML model is trained to perform second frame prediction based on a second loss function, and the second loss function is configured to adjust a second loss based on a second error between the second input frame and a second output frame for the second time period predicted by the ML model.

20. The method of claim 19, wherein the second error between the second input frame and the second output frame is predicted by the ML model based on:

a second estimated relative pose between the second image sensor and the scene, based on the second input frame, wherein the second input frame is associated with the scene;

a second estimated depth for the second input frame; and a second estimated motion of the first image sensor between the first input frame and a fourth input frame, for the third time period, associated with the first image sensor.

* * * * *